United States Patent
Si

(10) Patent No.: US 12,301,503 B2
(45) Date of Patent: May 13, 2025

(54) METHOD FOR MAPPING POSITIONING REFERENCE SIGNAL, TERMINAL, AND NETWORK-SIDE DEVICE

(71) Applicant: VIVO MOBILE COMMUNICATION CO., LTD., Guangdong (CN)

(72) Inventor: Ye Si, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 319 days.

(21) Appl. No.: 17/706,379

(22) Filed: Mar. 28, 2022

(65) Prior Publication Data

US 2022/0231816 A1 Jul. 21, 2022

Related U.S. Application Data

(63) Continuation of application No. PCT/CN2020/117737, filed on Sep. 25, 2020.

(30) Foreign Application Priority Data

Sep. 29, 2019 (CN) .......................... 201910935784.X
Oct. 10, 2019 (CN) .......................... 201910959843.7

(51) Int. Cl.
*H04L 12/26* (2006.01)
*H04L 5/00* (2006.01)

(52) U.S. Cl.
CPC .................................. *H04L 5/0053* (2013.01)

(58) Field of Classification Search
None
See application file for complete search history.

(56) References Cited

U.S. PATENT DOCUMENTS

| 10,862,530 | B2* | 12/2020 | Chen ....................... H04W 4/02 |
| 2011/0081933 | A1 | 4/2011 | Suh et al. |
| 2011/0158200 | A1 | 6/2011 | Bachu et al. |
| 2016/0065342 | A1 | 3/2016 | Mirbagheri et al. |
| 2016/0088599 | A1* | 3/2016 | Yang ..................... H04L 5/0041 370/329 |

(Continued)

FOREIGN PATENT DOCUMENTS

| CN | 102474402 A | 5/2012 |
| CN | 102647790 A | 8/2012 |

(Continued)

OTHER PUBLICATIONS

First Office Action for Chinese Application No. 201910959843.7 dated Sep. 16, 2021, 9 Pages.

(Continued)

*Primary Examiner* — Zewdu A Beyen
(74) *Attorney, Agent, or Firm* — BROOKS KUSHMAN P.C.

(57) ABSTRACT

A method for mapping a positioning reference signal, a terminal, and a network-side device are provided. The method for mapping a positioning reference signal is applied to a terminal and includes: obtaining mapping information of a positioning reference signal, where the mapping information indicates relative resource element offsets of at least some symbols in a positioning reference signal resource; and determining, based on the mapping information, a relative resource element offset of each symbol in the positioning reference signal resource.

17 Claims, 27 Drawing Sheets

(56) References Cited

U.S. PATENT DOCUMENTS

| | | | |
|---|---|---|---|
| 2018/0081933 A1 | 3/2018 | Marcotte | |
| 2018/0159641 A1 | 6/2018 | Xu et al. | |
| 2019/0124609 A1 | 4/2019 | Gheorghiu et al. | |
| 2022/0078836 A1 | 3/2022 | Jiang | |

FOREIGN PATENT DOCUMENTS

| | | |
|---|---|---|
| CN | 106211312 A | 12/2016 |
| CN | 107079419 A | 8/2017 |
| CN | 107277921 A | 10/2017 |
| CN | 108259148 A | 7/2018 |
| CN | 109863810 A | 6/2019 |
| CN | 111669257 A | 9/2020 |
| EP | 3998751 A1 | 5/2022 |

OTHER PUBLICATIONS

International Search Report and Written Opinion for Application No. PCT/CN2020/117737, dated Dec. 30, 2020, 8 Pages.
LG Electronics "Discussions on DL Reference Signals for NR Positioning, " 3GPP TSG RAN WG1 #97, Agenda item 7.2.10.1, May 13-17, 2019, R1-1906719, Reno, NV USA, 8 Pages.
Intel Corporation, "Summary of RAN1 Agreements on NR Positioning," 3GPP TSG RAN WG1 #98, Agenda item 7.2.10, Aug. 26-30, 2019, R1-1909919, Prague, Czech Republic, 29 Pages.
Intel Corporation, "List of Higher Layer Parameters for NR Positioning," 3GPP TSG RAN WG1 #98, Agenda item 7.2.10, Aug. 26-30, 2019, R1-1909932, Prague, Czech Republic, 9 Pages.
Intel Corporation, "Status Report of WI: NR Positioning Report," 3GPP TSG RAN WG1 #985, Agenda item 9.4.7, Sep. 16-20, 2019, RP-191874, Newport Beach, CA USA, 14 Pages.
Extended European Search Report for Application No. 20868137.9-1213, dated Sep. 28, 2022, 11 Pages.
Vivo, "Discussion on DL RS for NR Positioning," 3GPP TSG RAN WG1 #98, Agenda item 7.2.10.1, Aug. 26-30, 2019, R1-1908174, Prague, Czech Republic, 13 Pages.
Catt, "DL Reference Signals for NR Positioning," 3GPP TSG RAN WG1 #98, Agenda item 7.2.10.1, Aug. 26-30, 2019, R1-1908571, Prague, Czech Republic, 17 Pages.
Intel Corporation, "UL Reference Signals for NR Positioning," 3GPP TSG RAN WG1 #98, Agenda item 7.2.10.1, Aug. 26-30, 2019, R1-1908660, Prague, Czech Republic, 8 Pages.
$1^{st}$ Chinese Office Action, English Translation.
International Search Report and Written Opinion, English Translation.
CN102474402A, English Abstract and U.S. Equivalent U.S. Pub. No. 2011/0158200.
CN102647790A, English Abstract and Machine Translation.
CN106211312A, English Abstract and U.S. Equivalent U.S. Pub. No. 2018/0159641.
CN107079419A, English Abstract and U.S. Equivalent U.S. Pub. No. 2016/0065342.
CN107277921A, English Abstract and Machine Translation.
CN108259148A, English Abstract and Machine Translation.
CN109863810A, English Abstract and U.S. Equivalent U.S. Pub. No. 2022/0078836.
CN111669257A, English Abstract and Machine Translation.
First Office Action for Korean Application No. 10-2022-7014155, dated Oct. 25, 2024, 5 Pages.
Intel Corporation "DL Reference Signals for NR Positioning" 3GPP TSG RAN WG1 Meeting #98, Prague, Czech Republic, Aug. 2019, R1-1908659, 27 Pages.
Intel Corporation "Summary of Offline Discussion on DL/UL Reference Signals and Measurements for NR Positioning" 3GPP TSG RAN WG1 Meeting #98, Prague, Czech Republic, Aug. 2019, R1-1909794, 9 Pages.

* cited by examiner

Four PBCH antenna ports

One and two PBCH antenna ports

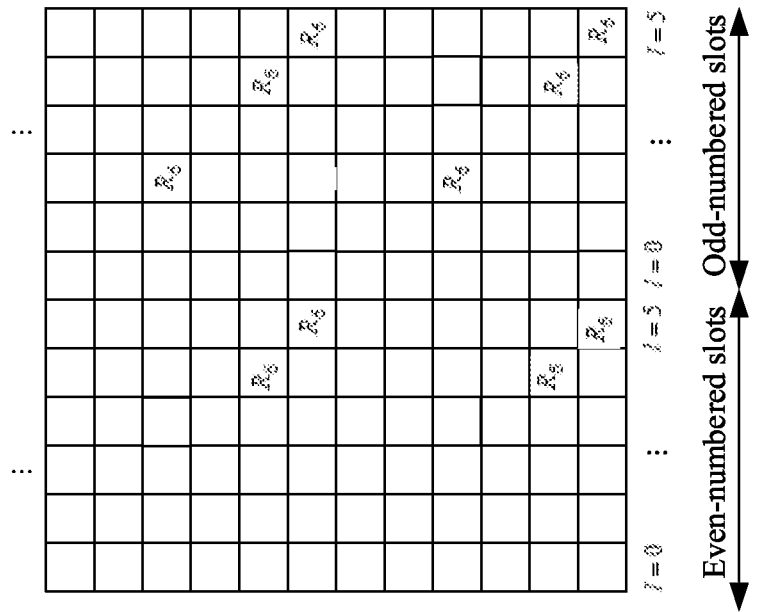
Four PBCH antenna ports
FIG. 3
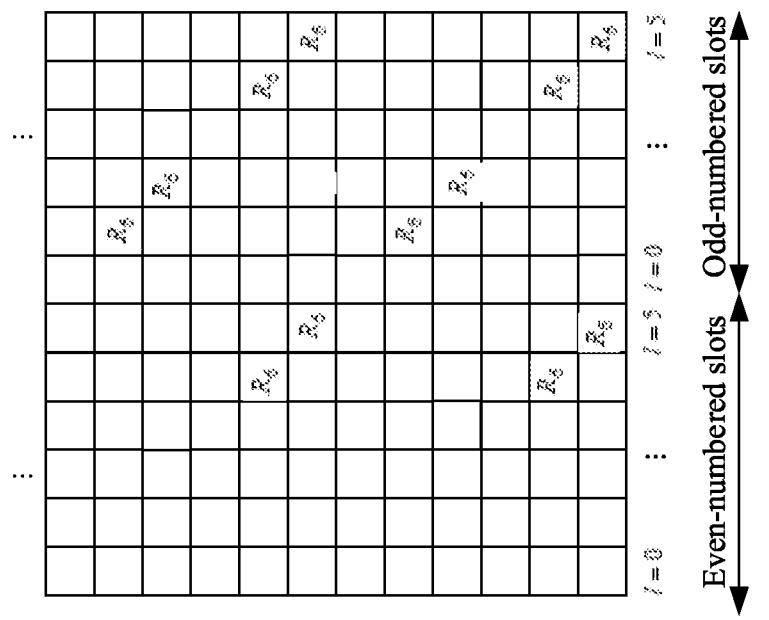
One and two PBCH antenna ports RE of positioning reference signal resource RE of positioning reference signal resource

METHOD FOR MAPPING POSITIONING REFERENCE SIGNAL, TERMINAL, AND NETWORK-SIDE DEVICE

CROSS-REFERENCE TO RELATED APPLICATIONS

This application is a continuation application of International Application No. PCT/CN2020/117737 filed on Sep. 25, 2020, which claims priority to Chinese Patent Application No. 201910935784.X, filed on Sep. 29, 2019, and Chinese Patent Application No. 201910959843.7, filed on Oct. 10, 2019, the disclosures of which are incorporated herein by reference in their entireties.

TECHNICAL FIELD

This disclosure relates to the field of communications technologies, and in particular, to a method for mapping a positioning reference signal, a terminal, and a network-side device.

BACKGROUND

Positioning reference signals (PRS) are reference signals (RS) used for downlink positioning. User equipment (UE) measures PRSs transmitted from a plurality of cells or a plurality of transmission points, to obtain a reference signal time difference (RSTD) between the plurality of cells or transmission points. Then, the UE transmits the obtained RSTD information to an evolved serving mobile location center (E-SMLC), and the E-SMLC obtains a location of the UE through calculation.

In addition to downlink positioning, uplink positioning is also supported in LTE. Uplink reference signals used for uplink positioning in LTE are sounding reference signals (SRS). A location measurement unit (LMU) located on an eNB side is used for estimating an uplink reference signal reception time difference of the UE to estimate a location of the UE, with no need for the UE to participate in positioning measurement and calculation.

In positioning reference signal resources, each of the symbols following a start symbol has a relative resource element offset (relative RE offset). With a same comb size and a same number of symbols, a plurality of configurations may be supported, but how to configure the relative RE offset to support the plurality of configurations has not yet been determined.

SUMMARY

Embodiments of this disclosure provide a method for mapping a positioning reference signal, a terminal, and a network-side device.

According to a first aspect, an embodiment of this disclosure provides a method for mapping a positioning reference signal, applied to a terminal and including:

obtaining mapping information of a positioning reference signal, where the mapping information indicates relative resource element offsets of at least some symbols in a positioning reference signal resource; and determining, based on the mapping information, a relative resource element offset of each symbol in the positioning reference signal resource.

According to a second aspect, an embodiment of this disclosure provides a method for mapping a positioning reference signal, applied to a terminal, and includes:

transmitting mapping information of a positioning reference signal to a terminal, where the mapping information indicates relative resource element offsets of at least some symbols in a positioning reference signal resource.

According to a third aspect, an embodiment of this disclosure further provides an apparatus for mapping a positioning reference signal, applied to a terminal and including:

an obtaining module, configured to obtain mapping information of a positioning reference signal, where the mapping information indicates relative resource element offsets of at least some symbols in a positioning reference signal resource; and a determining module, configured to determine, based on the mapping information, a relative resource element offset of each symbol in the positioning reference signal resource.

According to a fourth aspect, an embodiment of this disclosure provides an apparatus for mapping a positioning reference signal, applied to a network-side device and including:

a transmitting module, configured to transmit mapping information of a positioning reference signal to a terminal, where the mapping information indicates relative resource element offsets of at least some symbols in a positioning reference signal resource.

According to a fifth aspect, an embodiment of this disclosure further provides a communications device, where the communications device includes a processor, a memory, and a computer program stored in the memory and running on the processor; and when the processor executes the computer program, the steps of the foregoing method for mapping a positioning reference signal are implemented.

According to a sixth aspect, an embodiment of this disclosure provides a computer-readable storage medium, where the computer-readable storage medium stores a computer program, and when the computer program is executed by a processor, the steps of the foregoing method for mapping a positioning reference signal are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings.

FIG. 3 is a schematic diagram of a mapping structure of an LTE PRS signal with an extended cyclic prefix;

DETAILED DESCRIPTION

Figure 1:
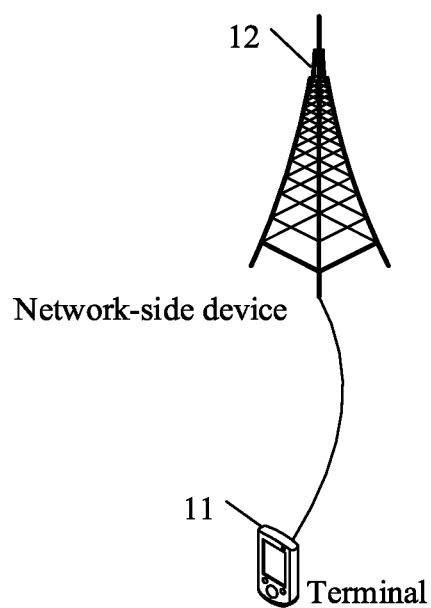
FIG. 1 is a block diagram of a mobile communications system to which an embodiment of this disclosure may be applied.

The following describes example embodiments of this disclosure in more detail with reference to the accompanying drawings. Although the example embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and completely convey the scope of this disclosure to persons skilled in the art.

The terms "first", "second", and the like in this specification and claims of this application are used to distinguish between similar objects instead of describing a specific order or sequence. It should be understood that the data used in this way is interchangeable in appropriate circumstances, so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. "And/or" in the specification and claims represents at least one of connected objects.

The technologies described herein are not limited to long term evolution (LTE)/LTE-Advanced (LTE-A) systems, and may also be used in various wireless communications systems, such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" are usually used interchangeably. The CDMA system may implement radio technologies such as CDMA2000 and universal terrestrial radio access (UTRA). UTRA includes wideband CDMA (WCDMA) and other CDMA variants. The TDMA system may implement radio technologies such as global system for mobile communications (GSM). The OFDMA system may implement radio technologies such as ultra mobile broadband (UMB), evolved UTRA (Evolution-UTRA, E-UTRA), IEEE 802.11 (Wi-Fi), IEEE 802.16 (WiMAX), IEEE 802.20, and Flash-OFDM. UTRA and E-UTRA are part of the universal mobile telecommunications system (UMTS). LTE and more advanced LTEs (such as LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described herein are applicable not only to the above-mentioned systems and radio technologies, but also to other systems and radio technologies. However, in the following descriptions, an NR system is described for an illustration purpose, and NR terms are used in most of the following descriptions, although these technologies may also be applied to other applications than an NR system application.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Referring to FIG. 1, FIG. 1 is a block diagram of a wireless communications system to which an embodiment of this disclosure may be applied. The wireless communications system includes a terminal 11 and a network-side device 12. The terminal 11 may also be referred to as a terminal device or user equipment (UE). The terminal 11 may be a terminal side device such as a mobile phone, a tablet personal computer, a laptop computer, a personal digital assistant (PDA), a mobile internet device (MID), a wearable device, or an in-vehicle device. It should be noted that the specific type of the terminal 11 is not limited in the embodiments of this disclosure. The network-side device 12 may be a base station or a core network, where the base station may be a base station of 5G or a later version (for example, gNB or 5G NR NB), or a base station in other communications systems (for example, an eNB, a WLAN access point, or another access point), or a location server (for example: E-SMLC or LMF (Location Manager Function)). The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, or some other appropriate term in the art. As long as the same technical effect is achieved, the base station is not limited to a specific technical term. It should be noted that the base station in the NR system is taken only as an example in the embodiments of this disclosure, but a specific type of the base station is not limited.

The base station may communicate with the terminal 11 under the control of a base station controller. In various examples, the base station controller may be a part of the core network or some base stations. Some base stations may exchange control information or user data with the core network by using backhauls. In some examples, some of these base stations may communicate with each other directly or indirectly by using backhaul links. The backhaul links may be wired or wireless communications links. The wireless communications system may support operations on a plurality of carriers (wave signals of different frequencies). A multi-carrier transmitter can transmit modulated signals on the plurality of carriers simultaneously. For example, multi-carrier signals modulated by using various radio technologies may be transmitted on each communications link. Each modulated signal may be transmitted on different carriers and may carry control information (for example, a reference signal or a control channel), overhead information, data, and the like.

The base station may communicate wirelessly with the terminal 11 through one or more access point antennas. Each base station may provide communication coverage for a corresponding coverage area of the base station. A coverage area of an access point may be divided into sectors forming only part of the coverage area. The wireless communications system may include different types of base stations (for example, a macro base station, a micro base station, and a picocell base station). The base station may also use different radio technologies, such as cellular and WLAN radio access technologies. The base station may be associated with a same access network or operator deployment or different access networks or operator deployments. Coverage areas of different base stations (including coverage areas of base stations of a same type or different types, coverage areas using a same radio technology or different radio technologies, or coverage areas of a same access network or different access networks) may overlap each other.

Communication links in the wireless communications system may include an uplink for carrying an uplink (UL) transmission (for example, from the terminal 11 to the network-side device 12), or a downlink for carrying a downlink (DL) transmission (for example, from the network-side device 12 to the terminal 11). The UL transmission may also be referred to as reverse link transmission, and the DL transmission may also be referred to as forward link transmission. A licensed band, an unlicensed band, or both may be used for the downlink transmission. Similarly, a licensed band, an unlicensed band, or both may be used for the uplink transmission.

Positioning reference signals (PRS) are reference signals (RS) used for downlink positioning. User equipment (UE) measures PRSs transmitted from a plurality of cells or a plurality of transmission points, to obtain a reference signal time difference (RSTD) between the plurality of cells or transmission points. Then, the UE transmits the obtained RSTD information to an evolved serving mobile location center (E-SMLC), and the E-SMLC obtains a location of the UE through calculation.

In long term evolution (LTE), a PRS can be transmitted on a resource block of a downlink subframe configured for transmitting the positioning reference signal. The PRS is transmitted through an antenna port 6, the PRS cannot be mapped onto a resource element (RE) allocated to a physical broadcast channel (PBCH), a primary synchronization signal (PSS), or a secondary synchronization signal (SSS), and the PRS does not overlap with a cell-specific reference signal transmitted through any antenna port. An adjacent cell obtains several subcarrier frequency shifts through a physical cell ID (PCI) modulo 6 to avoid PRS overlap.

The PRS is generated and mapped as follows:

A reference signal sequence $r_{l,n_s}(m)$ is defined as $$r_{l,n_s}(m) = \frac{1}{\sqrt{2}}(1 - 2 \cdot c(2m)) + j\frac{1}{\sqrt{2}}(1 - 2 \cdot c(2m+1)),$$

$$m = 0, 1, \ldots, 2N_{RB}^{max,DL} - 1$$

where $n_s$ is a slot number in a radio frame, l is an orthogonal frequency division multiplexing (OFDM) symbol number within the slot, and c(i) is a pseudo-random sequence.

The pseudo-random sequence is initialized as $$c_{init} = 2^{28} \cdot \lfloor N_{ID}^{PRS}/512 \rfloor + 2^{10} \cdot (7-(n_s+1)+l+1) - (2 \cdot (N_{ID}^{PRS} \bmod 512)+1) + 2 \cdot (N_{ID}^{PRS} \bmod 512) + N_{CP}$$

where $N_{ID}^{PRS} \in \{0, 1, \ldots, 4095\}$ is generally the same as $N_{ID}^{cell}$ (cell ID), and is configured by using high-layer signaling when there is a high-layer signaling indication. For a normal cyclic prefix (CP), $N_{CP}=1$, and for an extended cyclic prefix, $N_{CP}=0$ A time-frequency resource mapping formula of the reference signal is as follows:

$$a_{k,l}^{(p)=r}{}_{l,n_s}(m')$$

where for a normal cyclic prefix, $$k = 6(m + N_{RB}^{DL} - N_{RB}^{PRS}) + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and (1 or 2 } PBCH \text{ antenna ports)} \\ 2, 3, 5, 6 & \text{if } n_s \bmod 2 = 1 \text{ and (4 } PBCH \text{ antenna ports)} \end{cases}$$

$$m = 0, 1, \ldots, 2 \cdot N_{RB}^{PRS} - 1$$

$$m' = m + N_{RB}^{max,DL} - N_{RB}^{PRS}$$

and for an extended cyclic prefix, $$k = 6(m + N_{RB}^{DL} - N_{RB}^{PRS}) + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and (1 or 2 } PBCH \text{ antenna ports)} \\ 2, 4, 5 & \text{if } n_s \bmod 2 = 1 \text{ and (4 } PBCH \text{ antenna ports)} \end{cases}$$

$$m = 0, 1, \ldots, \cdot N_{RB}^{PRS} - 1$$

$$m' = m + N_{RB}^{max,DL} - N_{RB}^{PRS}$$

where a bandwidth $N_{RB}^{PRS}$ (number of RBs in a resource block) for the positioning reference signal is configured by a high layer, and a cell-specific frequency shift is given by $V_{shift} = N_{ID}^{PRS} \bmod 6$.

Figure 2:
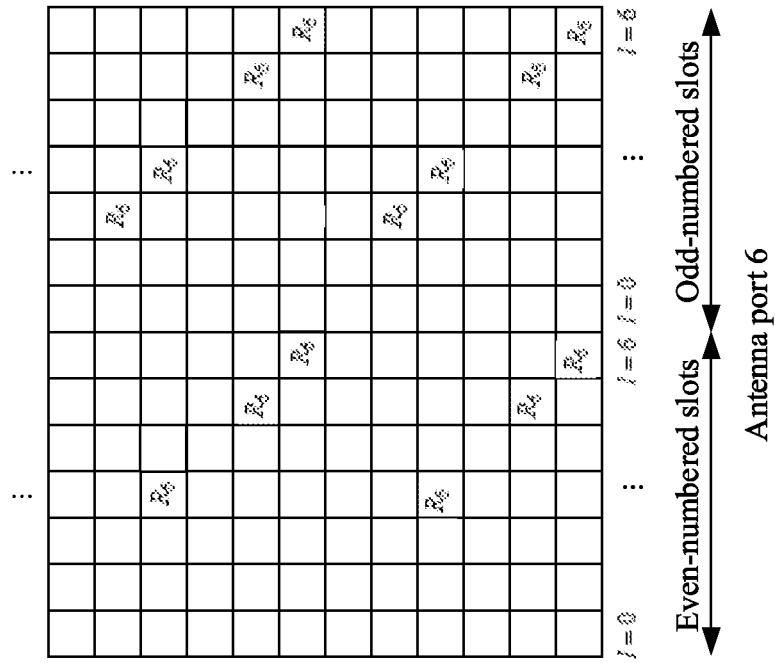
FIG. 2 is a schematic diagram of a mapping structure of an LTE PRS signal with a normal cyclic prefix.
Figure 2:
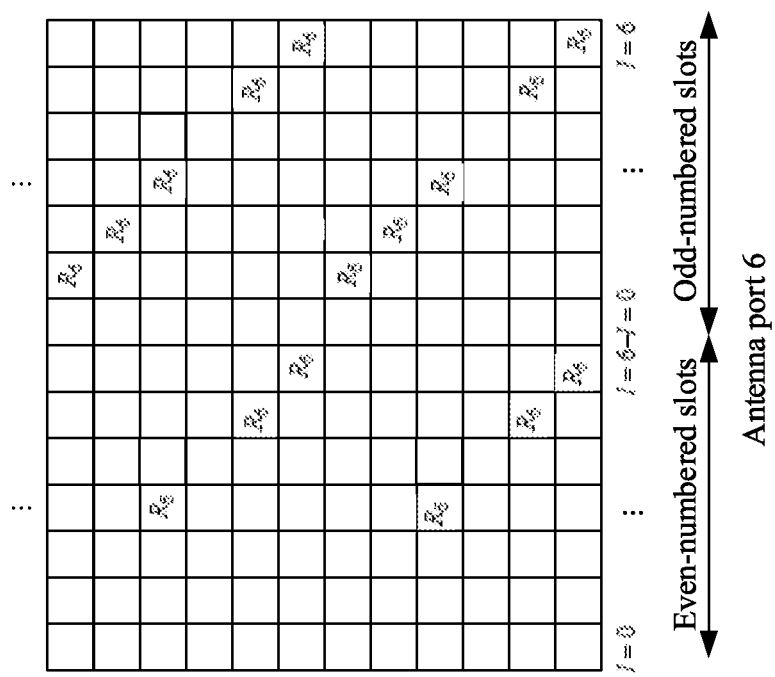

PRS signal mapping in an RB is shown in FIG. 2 and FIG. 3. It can be seen from the figure that the PRS signal is designed based on PRS ID modulo 6. The signal has relatively strong autocorrelation and orthogonality properties. Therefore, it is easier to determine a highest correlation peak when the signal is subjected to correlation detection, and signal interference from neighboring cells is eliminated, which ensures precision of an observed time difference of arrival (OTDOA) measurement.

In addition to downlink positioning, uplink positioning is also supported in LTE. Uplink reference signals used for uplink positioning in LTE are sounding reference signals (SRS). A location measurement unit (LMU) located on an eNB side is used for estimating an uplink reference signal reception time difference of the UE to estimate a location of the UE, with no need for the UE to participate in positioning measurement and calculation. To obtain an uplink measurement quantity, the LMU needs to know the characteristics of the SRS signal transmitted by the UE within a required time period for calculating the uplink measurement quantity. These characteristics should be static relative to periodically transmitted SRS signals in uplink measurement. Therefore, the E-SMLC indicates that a serving eNB requires to indicate the UE to transmit an SRS signal for uplink positioning. The eNB makes a final decision on resource allocation and returns this configuration information to the E-SMLC so that the E-SMLC can configure the LMU. The eNB may decide (for example, if no resources are available) to configure zero resources for the UE and report that the zero resources are configured for the E-SMLC.

In new radio (NR), a new radio downlink positioning reference signal based on an NR system (NR DL PRS) has been designed. PRSs can be transmitted at a maximum of 100 MHz in FR1 and a maximum of 400 MHz in FR2. An NR PRS bandwidth configuration is independent of a bandwidth part (BWP) configuration. When the PRS bandwidth is greater than the BWP bandwidth the UE can measure a PRS by using a measurement gap.

Beamforming can be applied to the PRS, and therefore a concept of PRS resources is introduced. A PRS resource ID may correspond to one beam at one transmission reception point (TRP). In addition, to increase audibility of the UE, PRS beam scanning and PRS beam repetition are supported. Moreover, the PRS can be used with reference to an RS of a neighboring cell as a spatial quasi-co-located (QCL) reference signal.

An interleaved pattern and a flexible pattern configuration can be used for the PRS. A comb structure of the PRS resource at least may support {2, 4, 6}; and the number of symbols at least may support {2, 4, 6}. Currently, the comb structure has not excluded {1, 8, 12}; and the number of symbols has not excluded {1, 3, 8, 12}.

For uplink positioning, an NR-based SRS is extended.

To enhance a probability of detecting an SRS by a gNB, an SRS comb structure is extended to {2, 4, 8}. In addition, the number of symbols in the SRS resource is increased to {1, 2, 4, 8, 12}, and other comb structures and symbol quantities are no longer allowed.

To improve flexibility of the SRS, a symbol location occupied by the SRS is extended to any location in a slot.

To improve positioning performance, an SRS pattern is extended to an interleaved pattern, similar to the DL PRS.

To support beamforming and enhance uplink coverage, SRS beam scanning and SRS beam repetition are supported. In addition, the SRS can be used with reference to an RS of a neighboring cell as a QCL reference signal.

With respect to SRS power control, the SRS can be used to calculate pathloss with reference to a pathloss RS of the neighboring cell, to enhance audibility of the neighboring cell.

Further, an RE pattern configuration of the DL PRS includes an RE offset of the first symbol of a DL PRS resource. In addition, a relative RE offset is defined for the following symbols. This value is an offset relative to an RE offset of the first symbol in frequency domain. Relative RE offsets of the following symbols should be derived from the configured number of symbols for a DL PRS resource, the comb size for the DL PRS resource, and a symbol index within the DL PRS resource.

In addition, similar conclusions have been reached about UL PRS pattern mapping.

In positioning reference signal resources, except a start symbol, each of the following symbols has a relative RE offset. With the same comb size, arrays or sequences of relative RE offsets with a same length may be configured according to the number of symbols in the positioning reference signal resource, but different arrays or sequences may be configured for different symbol quantities. With the same comb size, a pattern with a greater number of symbols may just repeat a pattern with a smaller number of symbols. If the foregoing method is still used to configure an array or sequence, large overheads are caused.

Figure 4:
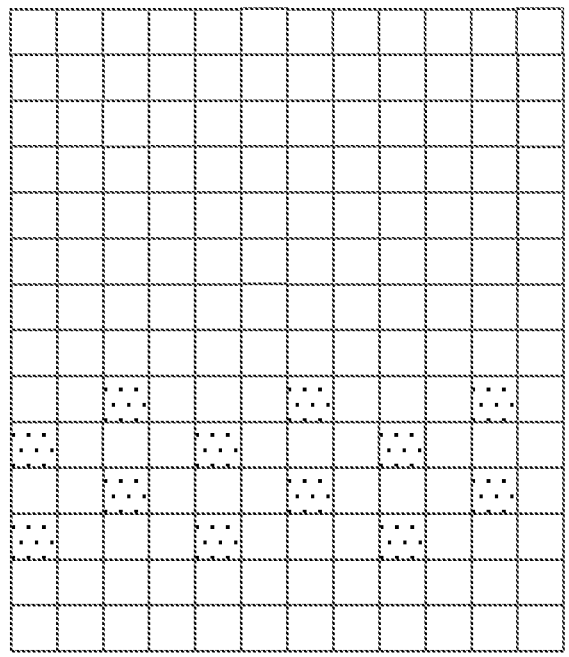
FIG. 4 is a schematic diagram of an equivalent comb-1 and an equivalent comb-2 of a comb-4 structure.
Figure 4:
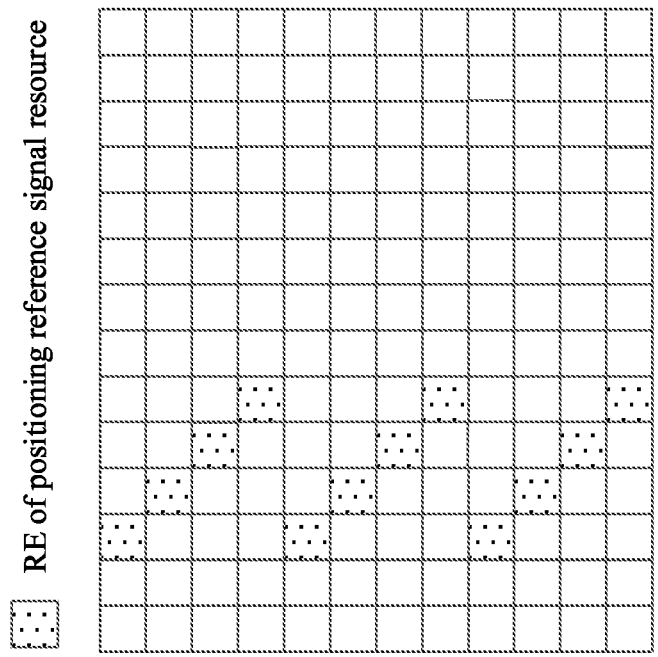

In addition, in the case shown in FIG. 4, how to configure a relative RE offset has not yet reached a decision. In FIG. 4, the part filled with dots is the REs of the positioning reference signal resource, the left half in FIG. 4 is for equivalent comb-1, and the right half in FIG. 4 is for equivalent comb-2.

Further, with the same comb size and the same number of symbols, a plurality of patterns may be supported. How to configure a relative RE offset to support the plurality of patterns has not yet reached a decision.

Embodiments of this disclosure provide a method for mapping a positioning reference signal, a terminal, and a network-side device.

Figure 5:
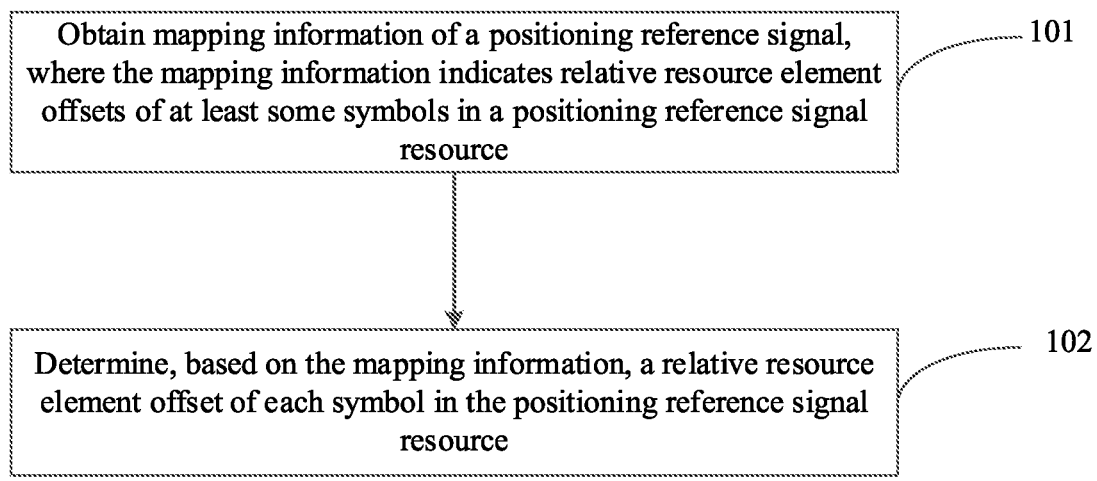
FIG. 5 is a schematic flowchart of a method for mapping a positioning reference signal on a terminal according to an embodiment of this disclosure.

An embodiment of this disclosure provides a method for mapping a positioning reference signal, applied to a terminal, and as shown in FIG. 5, including the following steps.

Step 101: Obtain mapping information of a positioning reference signal, where the mapping information indicates relative resource element offsets of at least some symbols in a positioning reference signal resource.

Step 102: Determine, based on the mapping information, a relative resource element offset of each symbol in the positioning reference signal resource.

In this embodiment, the terminal obtains mapping information of a positioning reference signal, where the mapping information indicates relative resource element offsets of at least some symbols in a positioning reference signal resource; and determines, based on the mapping information, a relative resource element offset of each symbol in the positioning reference signal resource. In this way, the terminal can determine, based on the relative resource element offset of each symbol, a resource element location of the positioning reference signal, and transmit the positioning reference signal through the resource element location.

The positioning reference signal may also be referred to as a positioning reference signal resource.

Optionally, after the determining, based on the mapping information, a relative resource element offset of each symbol in the positioning reference signal resource, the method further includes:

determining, based on the relative resource element offset of each symbol, a resource element location of the positioning reference signal; and transmitting the positioning reference signal through the resource element location.

Optionally, the mapping information is used for indicating configuration information of one set of relative resource element offsets in a table, and the obtaining mapping information of a positioning reference signal includes:

obtaining a table corresponding to a comb structure of the positioning reference signal, where the table includes at least one set of configuration information of relative resource element offsets.

Optionally, the obtaining mapping information of a positioning reference signal further includes:

obtaining indication information transmitted by a network-side device, where the indication information is used for indicating the terminal to use configuration information of one of sets of relative resource element offsets in the table as the mapping information of the positioning reference signal.

Optionally, one set of the configuration information includes $N_{length}^{Array}$ values indicating relative resource element offsets of the first $N_{length}^{Array}$ symbols in the positioning reference signal resource, respectively, and the relative resource element offset is an offset relative to a resource element offset of the first symbol.

Optionally, a value of $N_{length}^{Array}$ is not greater than the number of symbols $N_{symbol}^{PRS}$ in the positioning reference signal resource.

Optionally, if a value of $N_{length}^{Array}$ is less than the number of symbols $N_{symbol}^{PRS}$ in the positioning reference signal resource, the l'-th symbol in the positioning reference signal resource has the same relative resource element offset as the (l'−$N_{length}^{Array}$)-th symbol, that is, the l'-th symbol in the positioning reference signal resource has the same resource element location as the (l'−$N_{length}^{Array}$)-th symbol, where l' is greater than or equal to $N_{lenth}^{Array}$, and the 0-th symbol represents a start symbol of the positioning reference signal resource.

Optionally, a value of $N_{length}^{Array}$ is equal to a comb size of the positioning reference length signal resource.

Optionally, obtaining the configuration information includes at least one of the following manners:
  receiving the configuration information transmitted by a network-side device;
  obtaining the configuration information that is preconfigured; and
  obtaining the configuration information defined by a protocol.

Part of the configuration information may be transmitted by the network-side device, part of the configuration information may be preconfigured, or part of the configuration information may be defined by the protocol; or all the configuration information may be transmitted by the network-side device, or all the configuration information may be preconfigured, or all the configuration information may be defined by the protocol.

Optionally, the mapping information is used for indicating a generation formula used by the terminal for calculating a relative resource element offset of each symbol in the positioning reference signal, and the obtaining mapping information of a positioning reference signal includes:
  obtaining at least one generation formula of a relative resource element offset corresponding to a comb structure of the positioning reference signal, where the generation formula is used for generating a relative resource element offset of each symbol in the positioning reference signal. Specifically, the generation formula is used for generating the mapping information of the positioning reference signal, and the mapping information is the relative resource element offset of each symbol.

Optionally, the obtaining mapping information of a positioning reference signal further includes:
  obtaining indication information transmitted by a network-side device, where the indication information is used for indicating the terminal to generate a relative resource element offset of each symbol in the positioning reference signal by using one of the at least one generation formula.

Optionally, a calculation parameter of the generation formula includes at least one of the following:
  comb structure of the positioning reference signal resource;
  symbol index within the positioning reference signal resource; and
  number of symbols in the positioning reference signal resource.

Optionally, the number of symbols $N_{symbol}^{PRS}$ in the positioning reference signal resource is not less than X, X is a periodicity of the generation formula or a periodicity of a sequence generated by the generation formula, X is equal to $K_{TC}$ or is one of factors of $K_{TC}$, and $K_{TC}$ represents a comb size of the positioning reference signal resource.

Optionally, the obtaining the generation formula includes at least one of the following manners:
  receiving the generation formula transmitted by a network-side device;
  obtaining the generation formula that is preconfigured; and
  obtaining the generation formula defined by a protocol.

Part of the generation formula may be transmitted by the network-side device, part of the generation formula may be preconfigured, or part of the generation formula may be defined by the protocol; or all the generation formula may be transmitted by the network-side device, or all the generation formula may be preconfigured, or all the generation formula may be defined by the protocol.

Optionally, a relative resource element offset of the first symbol in the positioning reference signal resource is 0.

Optionally, the positioning reference signal is a downlink positioning reference signal, and the indication information is carried in long term evolution positioning protocol LPP signaling transmitted by the network-side device.

Optionally, a comb size supported by the downlink positioning reference signal includes at least one of 2, 4, 6, 8, and 12.

Optionally, the positioning reference signal is an uplink positioning reference signal, and the indication information is carried in radio resource control RRC signaling or LPP signaling transmitted by the network-side device.

Optionally, a comb size supported by the uplink positioning reference signal includes at least one of 2, 4, and 8.

Figure 6:
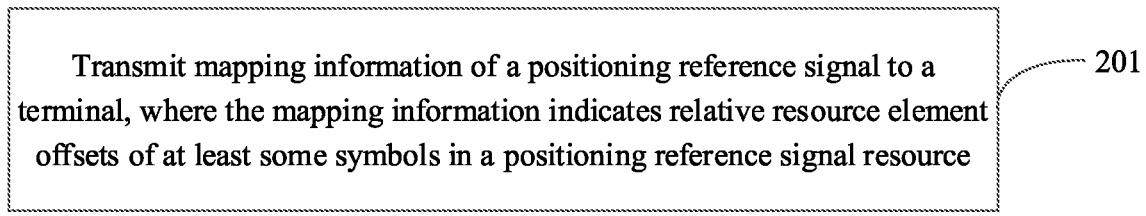
FIG. 6 is a schematic flowchart of a method for mapping a positioning reference signal on a network-side device according to an embodiment of this disclosure.

An embodiment of this disclosure further provides a method for mapping a positioning reference signal, applied to a network-side device, and as shown in FIG. 6, including the following steps.

Step 201: Transmit mapping information of a positioning reference signal to a terminal, where the mapping information indicates relative resource element offsets of at least some symbols in a positioning reference signal resource.

In this embodiment, the network-side device transmits mapping information of a positioning reference signal to a terminal, where the mapping information indicates relative resource element offsets of at least some symbols in a positioning reference signal resource; and the terminal determines, based on the mapping information, a relative resource element offset of each symbol in the positioning reference signal resource. In this way, the terminal can determine, based on the relative resource element offset of each symbol, a resource element location of the positioning reference signal, and transmit the positioning reference signal through the resource element location.

Optionally, the transmitting mapping information of a positioning reference signal to a terminal includes:
  transmitting a table corresponding to a comb structure of the positioning reference signal, where the table includes at least one set of configuration information of relative resource element offsets.

Optionally, the transmitting mapping information of a positioning reference signal to a terminal further includes:
  transmitting indication information to the terminal, where the indication information is used for indicating the terminal to use configuration information of one of sets of relative resource element offsets in the table as the mapping information of the positioning reference signal.

Optionally, one set of the configuration information includes $N_{length}^{Array}$ values indicating relative resource element offsets of the first $N_{length}^{Array}$ symbols in the positioning reference signal resource, respectively, and the relative resource element offset is an offset relative to a resource element offset of the first symbol.

Optionally, a value of $N_{length}^{Array}$ is not greater than the number of symbols $N_{symbol}^{PRS}$ in the positioning reference signal resource.

Optionally, if a value of $N_{length}^{Array}$ is less than the number of symbols $N_{symbol}^{PRS}$ in the positioning reference signal resource, the l'-th symbol in the positioning reference signal resource has a same relative resource element offset as the (l'-$N_{length}^{Array}$)-th symbol, where l' is greater than or equal to $N_{length}^{Array}$, and the 0-th symbol represents a start symbol of the positioning reference signal resource.

Optionally, a value of $N_{length}^{Array}$ is equal to a comb size of the positioning reference length signal resource.

Optionally, the transmitting mapping information of a positioning reference signal to a terminal includes:

transmitting at least one generation formula of a relative resource element offset corresponding to a comb structure of the positioning reference signal to the terminal, where the generation formula is used for generating a relative resource element offset of each symbol in the positioning reference signal.

Optionally, the transmitting mapping information of a positioning reference signal to a terminal further includes:

transmitting indication information to the terminal, where the indication information is used for indicating the terminal to generate a relative resource element offset of each symbol in the positioning reference signal by using one of the at least one generation formula.

Optionally, a calculation parameter of the generation formula includes at least one of the following:

comb structure of the positioning reference signal resource;

symbol index within the positioning reference signal resource; and number of symbols in the positioning reference signal resource.

Optionally, the number of symbols $N_{symbol}^{PRS}$ in the positioning reference signal resource is not less than X, X is a periodicity of the generation formula or a periodicity of a sequence generated by the generation formula, X is equal to $K_{TC}$ or is one of factors of $K_{TC}$, and $K_{TC}$ represents a comb size of the positioning reference signal resource.

Optionally, a relative resource element offset of the first symbol in the positioning reference signal resource is 0.

Optionally, the positioning reference signal is a downlink positioning reference signal, and the indication information is carried in long term evolution positioning protocol LPP signaling transmitted by the network-side device.

Optionally, a comb size supported by the downlink positioning reference signal includes at least one of 2, 4, 6, 8, and 12.

Optionally, the positioning reference signal is an uplink positioning reference signal, and the indication information is carried in radio resource control RRC signaling or LPP signaling transmitted by the network-side device.

Optionally, a comb size supported by the uplink positioning reference signal includes at least one of 2, 4, and 8.

The method for mapping a positioning reference signal according to this disclosure are further described below with reference to specific embodiments.

Embodiment 1

In this embodiment, a table is used to indicate the relative RE offset of the symbol in the positioning reference signal resource to the terminal.

The table may at least include configuration information of one relative RE offset, and the configuration information may be expressed as an array, a sequence, a vector, or a unit. According to a protocol and/or indication from the network-side device, the UE derives a relative RE offset by using specific configuration information in the table. The configuration information may include $N_{length}^{Array}$ values, which are used to represent relative RE offsets of the first $N_{length}^{Array}$ symbols in the positioning reference signal resource.

Further, the number of symbols $N_{symbol}^{PRS}$ in the positioning reference signal resource configured by a network side device is not less than Array Further, if the number of symbols $N_{symbol}^{PRS}$ is greater than $N_{length}^{Array}$, the UE shall assume that the l'-th symbol in the positioning reference signal resource has the same RE location (or relative RE offset) as the (l'-$N_{length}^{Array}$)-th symbol, where l' is not less than $N_{length}^{Array}$, l'=0, 1 ... $N_{symbol}^{PRS}$-1, $N_{symbol}^{PRS}$ represents the number of symbols occupied by the resource, and the 0-th symbol represents a start symbol of the positioning reference signal resource.

Further, the relative RE offset of the first symbol in the positioning reference signal resource is 0 by default.

Specifically, the network side may configure one of the following comb structures:

For a comb-2 structure, the table corresponding to the relative RE offset is stipulated by the protocol or configured by the network side, as shown below. The table includes only one configuration, that is, configuration 1. Configuration 1 includes two values used for indicating relative RE offsets of the first 2 ↑ symbols in the positioning reference signal resource.

| Configuration index | Relative RE offset configuration |
|---|---|
| Configuration 1 | {0, 1} |

For a comb-4 structure, the protocol stipulates that the table corresponding to the relative RE offset includes a plurality of configurations, and the network side indicates one of the configurations to the UE. The configurations in the table are shown below. It can be seen that the table includes at least two of the following configurations, such as configuration 1, configuration 2, configuration 3, and so on.

Alternatively, a table corresponding to the relative RE offset is directly configured by the network side for the UE or stipulated by the protocol. The table includes only one configuration, and a value of the configuration may be one of the following configurations (configuration 1, configuration 2, configuration 3, and so on).

| Relative RE offset configuration index | Relative RE offset configuration |
|---|---|
| Configuration 1 | {0, 2, 1, 3} |
| Configuration 2 | {0, 1, 2, 3} |
| Configuration 3 | {0, 2} |
| ... | ... |

When the value of the configuration is the foregoing configuration 3, the positioning reference signal resource is an equivalent comb-2 structure.

For a comb-6 structure, the protocol stipulates that the table corresponding to the relative RE offset includes a plurality of configurations, and the network side indicates one of the configurations to the UE. The configurations in the table are shown below. It can be seen that the table includes at least two of the following configurations, such as configuration 1, configuration 2, configuration 3, configuration 4, configuration 5, and so on.

Alternatively, a table corresponding to the relative RE offset is directly configured by the network side for the UE or stipulated by the protocol. The table includes only one configuration, and a value of the configuration may include one of the following configurations (configuration 1, configuration 2, configuration 3, configuration 4, configuration 5, and so on).

| Configuration index | Relative RE offset configuration |
|---|---|
| Configuration 1 | {0, 3, 1, 4, 2, 5} |
| Configuration 2 | {0, 2, 4, 1, 3, 5} |
| Configuration 3 | {0, 1, 2, 3, 4, 5} |
| Configuration 4 | {0, 2, 4}/{0, 4, 2} |
| Configuration 5 | {0, 3} |
| . . . | . . . |

Configuration 4 corresponds to two values, any one of which can be selected.

For a comb-8 structure, the protocol stipulates that the table corresponding to the relative RE offset includes a plurality of configurations, and the network side indicates one of the configurations to the UE. The configurations in the table are shown below. It can be seen that the table includes at least two of the following configurations, such as configuration 1, configuration 2, configuration 3, configuration 4, configuration 5, configuration 6, configuration 7, and so on.

Alternatively, a table corresponding to the relative RE offset is directly configured by the network side for the UE or stipulated by the protocol. The table includes only one configuration, and a value of the configuration may be one of the following configurations (configuration 1, configuration 2, configuration 3, configuration 4, configuration 5, configuration 6, configuration 7, and so on).

| Configuration index | Relative RE offset configuration |
|---|---|
| Configuration 1 | {0, 4, 1, 5, 2, 6, 3, 7} |
| Configuration 2 | {0, 2, 4, 6, 1, 3, 5, 7} |
| Configuration 3 | {0, 4, 2, 6, 1, 5, 3, 7} |
| Configuration 4 | {0, 1, 2, 3, 4, 5, 6, 7} |
| Configuration 5 | {0, 4, 2, 6} |
| Configuration 6 | {0, 2, 4, 6} |
| Configuration 7 | {0, 4} |
| . . . | . . . |

For a comb-12 structure, the protocol stipulates that the table corresponding to the relative RE offset includes a plurality of configurations, and the network side indicates one of the configurations to the UE. The configurations in the table are shown below. It can be seen that the table includes at least two of the following configurations, such as configuration 1, configuration 2, configuration 3, configuration 4, configuration 5, configuration 6, configuration 7, configuration 8, configuration 9, configuration 10, configuration 11, configuration 12, configuration 13, configuration 14, configuration 15, and so on.

Alternatively, a table corresponding to the relative RE offset is directly configured by the network side for the UE or stipulated by the protocol. The table includes only one configuration, and a value of the configuration may be one of the following configurations (configuration 1, configuration 2, configuration 3, configuration 4, configuration 5, configuration 6, configuration 7, configuration 8, configuration 9, configuration 10, configuration 11, configuration 12, configuration 13, configuration 14, configuration 15, and so on).

| Configuration index | Relative RE offset configuration |
|---|---|
| Configuration 1 | {0, 6, 1, 7, 2, 8, 3, 9, 4, 10, 5, 11} |
| Configuration 2 | {0, 4, 8, 1, 5, 9, 2, 6, 10, 3, 7, 11} |
| Configuration 3 | {0, 6, 3, 9, 1, 7, 4, 10, 2, 8, 5, 11} |
| Configuration 4 | {0, 3, 6, 9, 1, 4, 7, 10, 2, 5, 8, 11} |
| Configuration 5 | {0, 2, 4, 6, 8, 10, 1, 3, 5, 7, 9, 11} |
| Configuration 6 | {0, 6, 2, 8, 4, 10, 1, 7, 3, 9, 5, 11} |
| Configuration 7 | {0, 4, 8, 2, 6, 10, 1, 5, 9, 3, 7, 11} |
| Configuration 8 | {0, 1, 2, 3, 4, 5, 6, 7, 8, 9, 10, 11} |
| Configuration 9 | {0, 2, 4, 6, 8, 10} |
| Configuration 10 | {0, 4, 8, 2, 6, 10} |
| Configuration 11 | {0, 6, 2, 8, 4, 10} |
| Configuration 12 | {0, 3, 6, 9} |
| Configuration 13 | {0, 6, 3, 9} |
| Configuration 14 | {0, 4, 8}/{0, 8, 4} |
| Configuration 15 | {0, 6} |
| . . . | . . . |

Embodiment 2

In this embodiment, a generation formula is used to indicate the relative RE offset of the symbol in the positioning reference signal resource to the terminal.

Specifically, according to the protocol and/or indication from the network side, the UE uses a generation formula to derive a relative RE offset of each symbol in the positioning reference signal resource. According to the generation formula, the UE may generate the relative RE offset of each symbol in the positioning reference signal resource. The generation formula is associated with a comb structure of the positioning reference signal resource, a symbol index within the resource, and/or the number of symbols in the resource. In the generation formula, $l'$ represents the symbol index within the resource, $l'=0, 1 \ldots N_{symbol}^{PRS}-1$, where $N_{symbol}^{PRS}$ represents the number of symbols occupied by the positioning reference signal resource, $l'=0$ represents an index of the start symbol within the positioning reference signal resource, and $K_{TC}$ represents a comb size of the positioning reference signal resource.

Further, the relative RE offset of the first symbol in the positioning reference signal resource is 0 by default.

Further, the number of symbols $N_{symbol}^{PRS}$ in the positioning reference signal resource configured by the network side is not less than X, where X represents a periodicity of the generation formula (or a periodicity of a sequence generated by the generation formula), which may be equal to $K_{TC}$ or be one of the factors of $K_{TC}$.

Specifically, the network side may configure one of the following comb structures:

For a comb-2 structure, the protocol stipulates a generation formula, such as formula (1) (there is only one), of the relative RE offset of each symbol in the positioning reference signal resource:

$$RE_{relative\_offset} = \mathrm{floor}\left(\frac{l' \bmod (K_{TC})}{2}\right) + K_{TC}/2 * l' \bmod(2) \qquad (1)$$

For a comb-4 structure, the protocol stipulates that a generation formula of the relative RE offset of each symbol in the positioning reference signal resource is one of formula (2) to formula (4). Specifically, there are total three generation formulas corresponding to pattern configuration 1, pattern configuration 2, and pattern configuration 3, respectively, as shown below.

Alternatively, the protocol stipulates a plurality of generation formulas, and the network side indicates to use one of the generation formulas. The plurality of generation formulas include at least two of the formula (2) to formula (4):

$$RE_{relative\_offset} = floor\left(\frac{l' \mod (K_{TC})}{2}\right) + K_{TC}/2 * l' \mod(2) \quad (2)$$

$$RE_{relative\_offset} = l' \mod(K_{TC}) \quad (3)$$

$$RE_{relative\_offset} = K_{TC}/2 * l' \mod(2) \quad (4)$$

For a comb-6 structure, the protocol stipulates that a generation formula of the relative RE offset of each symbol in the positioning reference signal resource is one of formula (5) to formula (9). Specifically, there are five generation formulas corresponding to pattern configuration 1, pattern configuration 2, pattern configuration 3, pattern configuration 4, and pattern configuration 5, respectively, as shown below.

Alternatively, the protocol stipulates a plurality of generation formulas, and the network side indicates one of the generation formulas. The plurality of generation formulas include at least two of the formula (5) to formula (9):

$$RE_{relative\_offset} = floor\left(\frac{l' \mod (K_{TC})}{2}\right) + K_{TC}/2 * l' \mod(2) \quad (5)$$

$$RE_{relative\_offset} = floor\left(\frac{l' \mod (K_{TC})}{3}\right) + K_{TC}/3 * l' \mod(3) \quad (6)$$

$$RE_{relative\_offset} = l' \mod(K_{TC}) \quad (7)$$

$$RE_{relative\_offset} = K_{TC}/3 * l' \mod(3) \quad (8)$$

$$RE_{relative\_offset} = K_{TC}/2 * l' \mod(2) \quad (9)$$

For a comb-8 structure, the protocol stipulates that a generation formula of the relative RE offset of each symbol in the positioning reference signal resource is one of formula (10) to formula (16). Specifically, there are seven generation formulas corresponding to pattern configuration 1, pattern configuration 2, pattern configuration 3, pattern configuration 4, pattern configuration 5, pattern configuration 6, and pattern configuration 7, respectively, as shown below.

Alternatively, the protocol stipulates a plurality of generation formulas, and the network side indicates to use one of the formulas. The plurality of generation formulas include at least two of the formula (10) to formula (16):

$$RE_{relative\_offset} = floor\left(\frac{l' \mod (K_{TC})}{2}\right) + K_{TC}/2 * l' \mod(2) \quad (10)$$

$$RE_{relative\_offset} = floor\left(\frac{l' \mod (K_{TC})}{4}\right) + K_{TC}/2 * l' \mod(4) \quad (11)$$

$$RE_{relative\_offset} = floor\left(\frac{l' \mod (K_{TC})}{4}\right) + \\ 2 * \left(floor\left(\frac{l' \mod (K_{TC}/2)}{2}\right) + K_{TC}/4 * (l' \mod(K_{TC}/2)) \mod(2)\right) \quad (12)$$

where formula (12) may be further optimized to the following formula:

$$RE_{relative\_offset} = \\ floor\left(\frac{l' \mod (K_{TC})}{4}\right) + K_{TC}/4 * floor\left(\frac{l' \mod (4)}{2}\right) + K_{TC}/2 * l' \mod(2)$$

$$RE_{relative\_offset} = l' \mod(K_{TC}) \quad (13)$$

$$RE_{relative\_offset} = \\ 2 * \left(floor\left(\frac{l' \mod (K_{TC}/2)}{2}\right) + K_{TC}/4 * (l' \mod (K_{TC}/2)) \mod(2)\right) \quad (14)$$

where formula (14) may be further optimized to the following formula:

$$RE_{relative\_offset} = K_{TC}/4 * floor\left(\frac{l' \mod (4)}{2}\right) + K_{TC}/2 * l' \mod(2)$$

$$RE_{relative\_offset} = K_{TC}/4 * l' \mod(4) \quad (15)$$

$$RE_{relative\_offset} = K_{TC}/2 * l' \mod(2) \quad (16)$$

For a comb-12 structure, the protocol stipulates that a generation formula of the relative RE offset of each symbol in the positioning reference signal resource is one of formula (17) to formula (31). Specifically, there are fifteen generation formulas corresponding to pattern configuration 1, pattern configuration 2, pattern configuration 3, pattern configuration 4, pattern configuration 5, pattern configuration 6, pattern configuration 7, pattern configuration 8, pattern configuration 9, pattern configuration 10, pattern configuration 11, pattern configuration 12, pattern configuration 13, pattern configuration 14, and pattern configuration 15, respectively, as shown below.

Alternatively, the protocol stipulates a plurality of generation formulas, and the network side indicates one of the generation formulas. The plurality of generation formulas include at least two of the formula (17) to formula (31):

$$RE_{relative\_offset} = floor\left(\frac{l' \mod (K_{TC})}{2}\right) + K_{TC}/2 * l' \mod(2) \quad (17)$$

$$RE_{relative\_offset} = floor\left(\frac{l' \mod (K_{TC})}{3}\right) + K_{TC}/3 * l' \mod(3) \quad (18)$$

$$RE_{relative\_offset} = floor\left(\frac{l' \mod (K_{TC})}{4}\right) + \\ 3 * \left(floor\left(\frac{l' \mod (K_{TC}/3)}{2}\right) + K_{TC}/6 * (l' \mod(K_{TC}/3)) \mod(2)\right) \quad (19)$$

where formula (19) may be further optimized to the following formula:

$$RE_{relative_{offset}} = \text{floor}\left(\frac{l' \bmod (K_{TC})}{4}\right) + K_{TC}/4 * \text{floor}\left(\frac{l' \bmod (4)}{2}\right) + K_{TC}/2 * l' \bmod(2)$$

$$RE_{relative\_offset} = \text{floor}\left(\frac{l' \bmod (K_{TC})}{4}\right) + K_{TC}/4 * l' \bmod(4) \quad (20)$$

$$RE_{relative\_offset} = \text{floor}\left(\frac{l' \bmod (K_{TC})}{6}\right) + K_{TC}/6 * l' \bmod(6) \quad (21)$$

$$RE_{relative_{offset}} = \text{floor}\left(\frac{l' \bmod (K_{TC})}{6}\right) + \quad (22)$$
$$2 * \left(\text{floor}\left(\frac{l' \bmod (K_{TC}/2)}{2}\right) + K_{TC}/4 * (l' \bmod(K_{TC}/2)) \bmod(2)\right)$$

where formula (22) may be further optimized to the following formula:

$$RE_{relative_{offset}} =$$
$$\text{floor}\left(\frac{l' \bmod (K_{TC})}{6}\right) + \frac{K_{TC}}{6} * \text{floor}\left(\frac{l' \bmod (6)}{2}\right) + K_{TC}/2 * l' \bmod(2)$$

$$RE_{relative_{offset}} = \text{floor}\left(\frac{l' \bmod (K_{TC})}{6}\right) + \quad (23)$$
$$2 * \left(\text{floor}\left(\frac{l' \bmod (K_{TC}/2)}{3}\right) + K_{TC}/6 * l' \bmod(K_{TC}/2)\right) \bmod(3)$$

where formula (23) may be further optimized to the following formula:

$$RE_{relative_{offset}} =$$
$$\text{floor}\left(\frac{l' \bmod (K_{TC})}{6}\right) + \frac{K_{TC}}{6} * \text{floor}\left(\frac{l' \bmod (6)}{3}\right) + K_{TC}/3 * l' \bmod(3)$$

$$RE_{relative\_offset} = l' \bmod(K_{TC}) \quad (24)$$

$$RE_{relative\_offset} = K_{TC}/6 * l' \bmod(6) \quad (25)$$

$$RE_{relative\_offset} = \quad (26)$$
$$2 * \left(\text{floor}\left(\frac{l' \bmod (K_{TC}/2)}{3}\right) + K_{TC}/6 * (l' \bmod(K_{TC}/2)) \bmod(3)\right)$$

where formula (26) may be further optimized to the following formula:

$$RE_{relative\_offset} = \frac{K_{TC}}{6} * \text{floor}\left(\frac{l' \bmod (6)}{3}\right) + K_{TC}/3 * l' \bmod(3)$$

$$RE_{relative\_offset} = \quad (27)$$
$$2 * \left(\text{floor}\left(\frac{l' \bmod (K_{TC}/2)}{2}\right) + K_{TC}/4 * (l' \bmod(K_{TC}/2)) \bmod(2)\right)$$

where formula (27) may be further optimized to the following formula:

$$RE_{relative\_offset} = \quad (28)$$
$$\frac{K_{TC}}{6} * \text{floor}\left(\frac{l' \bmod (6)}{2}\right) + K_{TC}/2 * l' \bmod(2) \quad RE_{relative\_offset} =$$
$$K_{TC}/4 * l' \bmod(4)$$

$$RE_{relative\_ofset} = \quad (29)$$
$$3 * \left(\text{floor}\left(\frac{l' \bmod (K_{TC}/3)}{2}\right) + 2 * (l' \bmod(K_{TC}/3)) \bmod(2)\right)$$

where formula (29) may be further optimized to the following formula:

$$RE_{relative\_offset} = K_{TC}/4 * \text{floor}\left(\frac{l' \bmod (4)}{2}\right) + K_{TC}/2 * l' \bmod(2)$$

$$RE_{relative\_offset} = K_{TC}/3 * l' \bmod(3) \quad (30)$$

$$RE_{relative\_offset} = K_{TC}/2 * l' \bmod(2) \quad (31)$$

Embodiment 3

In this embodiment, an array is used to indicate the relative RE offset of the symbol in the positioning reference signal resource to the terminal.

An array (which may also be a sequence or vector) of length of $N_{length}^{Array}$ is configured by the network side or stipulated by the protocol, and is used to represent relative RE offsets of the first $N_{length}^{Array}$ symbol in the positioning reference signal resource. According to the array, the UE may generate the relative RE offset of each symbol in the positioning reference signal resource.

Further, the number of symbols $N_{symbol}^{PRS}$ in the positioning reference signal resource configured by the network side is not less than the length $N_{length}^{Array}$ of the array.

Further, if the number of symbols $N_{symbol}^{PRS}$ is greater than $N_{length}^{Array}$, the UE shall assume that the l'-th symbol in the positioning reference signal resource has the same RE location (or relative RE offset) as the (l'−$N_{length}^{Array}$)-th symbol, where l' is not less than $N_{length}^{Array}$, l'=0, 1 . . . $N_{symbol}^{PRS}$−1, and $N_{symbol}^{PRS}$ represents the number of symbols occupied by the positioning reference signal resource.

Further, the relative RE offset of the first symbol in the positioning reference signal resource is 0 by default.

Specifically, the network side may configure one of the following comb structures:

For a comb-2 structure, the array corresponding to the relative RE offset stipulated by the protocol or configured by the network side is {0, 1}.

For a comb-4 structure, the protocol stipulates a plurality of array configurations corresponding to the relative RE offsets, and one of the array configurations is indicated by the network side. The array configurations are as follows. The plurality of array configurations include at least two of configuration 1, configuration 2, configuration 3, and so on.

Alternatively, an array corresponding to the relative RE offset is configured by the network side for the UE or stipulated by the protocol. A value of the array may be one of the following configurations (configuration 1, configuration 2, configuration 3, and so on).

| PRS pattern configuration | Relative RE offset array |
|---|---|
| Configuration 1 | {0, 2, 1, 3} |
| Configuration 2 | {0, 1, 2, 3} |
| Configuration 3 | {0, 2} |
| . . . | . . . |

For a comb-6 structure, the protocol stipulates a plurality of array configurations corresponding to the relative RE offset, and one of the array configurations is indicated by the network side. The array configurations are as follows. The plurality of array configurations include at least two of configuration 1, configuration 2, configuration 3, configuration 4, configuration 5, and so on.

Alternatively, an array corresponding to the relative RE offset is configured by the network side for the UE or stipulated by the protocol. A value of the array may be one of the following configurations (configuration 1, configuration 2, configuration 3, configuration 4, configuration 5, and so on).

| PRS pattern configuration | Relative RE offset array |
|---|---|
| Configuration 1 | {0, 3, 1, 4, 2, 5} |
| Configuration 2 | {0, 2, 4, 1, 3, 5} |
| Configuration 3 | {0, 1, 2, 3, 4, 5} |
| Configuration 4 | {0, 2, 4}/{0, 4, 2} |
| Configuration 5 | {0, 3} |
| ... | ... |

For a comb-8 structure, the protocol stipulates a plurality of array configurations corresponding to the relative RE offset, and one of the array configurations is indicated by the network side. The array configurations are as follows. The plurality of array configurations include at least two of configuration 1, configuration 2, configuration 3, configuration 4, configuration 5, configuration 6, configuration 7, and so on.

Alternatively, an array corresponding to the relative RE offset is configured by the network side for the UE or stipulated by the protocol. A value of the array may be one of the following configurations (configuration 1, configuration 2, configuration 3, configuration 4, configuration 5, configuration 6, configuration 7, and so on).

| PRS pattern configuration | Relative RE offset array |
|---|---|
| Configuration 1 | {0, 4, 1, 5, 2, 6, 3, 7} |
| Configuration 2 | {0, 2, 4, 6, 1, 3, 5, 7} |
| Configuration 3 | {0, 4, 2, 6, 1, 5, 3, 7} |
| Configuration 4 | {0, 1, 2, 3, 4, 5, 6, 7} |
| Configuration 5 | {0, 4, 2, 6} |
| Configuration 6 | {0, 2, 4, 6} |
| Configuration 7 | {0, 4} |
| ... | ... |

For a comb-12 structure, the protocol stipulates a plurality of array configurations corresponding to the relative RE offset, and one of the array configurations is indicated by the network side. The array configurations are as follows. The plurality of array configurations include at least two of configuration 1, configuration 2, configuration 3, configuration 4, configuration 5, configuration 6, configuration 7, configuration 8, configuration 9, configuration 10, configuration 11, configuration 12, configuration 13, configuration 14, configuration 15, and so on.

Alternatively, an array corresponding to the relative RE offset is configured by the network side for the UE or stipulated by the protocol. The table includes only one configuration, and a value of the configuration may be one of the following configurations (configuration 1, configuration 2, configuration 3, configuration 4, configuration 5, configuration 6, configuration 7, configuration 8, configuration 9, configuration 10, configuration 11, configuration 12, configuration 13, configuration 14, configuration 15, and so on).

| PRS pattern configuration | Relative RE offset array |
|---|---|
| Configuration 1 | {0, 6, 1, 7, 2, 8, 3, 9, 4, 10, 5, 11} |
| Configuration 2 | {0, 4, 8, 1, 5, 9, 2, 6, 10, 3, 7, 11} |
| Configuration 3 | {0, 6, 3, 9, 1, 7, 4, 10, 2, 8, 5, 11} |
| Configuration 4 | {0, 3, 6, 9, 1, 4, 7, 10, 2, 5, 8, 11} |
| Configuration 5 | {0, 2, 4, 6, 8, 10, 1, 3, 5, 7, 9, 11} |
| Configuration 6 | {0, 6, 2, 8, 4, 10, 1, 7, 3, 9, 5, 11} |
| Configuration 7 | {0, 4, 8, 2, 6, 10, 1, 5, 9, 3, 7, 11} |
| Configuration 8 | {0, 1, 2, 3, 4, 5, 6, 7, 8, 9, 10, 11} |
| Configuration 9 | {0, 2, 4, 6, 8, 10} |
| Configuration 10 | {0, 4, 8, 2, 6, 10} |
| Configuration 11 | {0, 6, 2, 8, 4, 10} |
| Configuration 12 | {0, 3, 6, 9} |
| Configuration 13 | {0, 6, 3, 9} |
| Configuration 14 | {0, 4, 8}/{0, 8, 4} |
| Configuration 15 | {0, 6} |
| ... | ... |

The method for mapping a positioning reference signal according to this disclosure are further described below with reference to the accompanying drawings and specific embodiments.

Implementation 1

In this implementation, a symbol index within a positioning reference signal resource may use l' to represent a symbol count starting from the positioning reference signal resource; and l'=0 represents a start symbol of the positioning reference signal resource; l'=0, 1 ... $N_{symbol}^{PRS}-1$, where $N_{symsol}^{PRS}$ represents the number of symbols occupied by the resource.

According to the solutions described in Implementation 1 and Implementation 3, the UE may obtain relative RE offsets of the first $N_{length}^{Array}$ symbols in the positioning reference signal resource.

A relative RE offset corresponding to the l'-th symbol in the positioning reference signal resource has the same value as a relative RE offset of a symbol whose index is l' mod($M_{length}^{Array}$) in the positioning reference signal resource.

Implementation 2

According to the protocol and/or indication from the network side, the UE uses a generation formula to derive a relative RE offset of each symbol in the positioning reference signal resource. According to the generation formula, the UE may generate the relative RE offset of each symbol in the positioning reference signal resource. The generation formula is associated with a comb structure of the positioning reference signal resource, a symbol index within the resource, and/or the number of symbols in the resource. In the generation formula, l' represents a symbol index within the resource; and l'=0, 1 ... $N_{symbol}^{PRS}-1$, where $N_{symbol}^{PRS}$ symbol represents the number of symbols occupied by the resource, l'=0 represents an index of the start symbol within this resource; and $K_{TC}$ represents a comb size of the resource.

Further, the number of symbols $N_{symbol}^{PRS}$ in the positioning reference signal resource configured by the network side is not less than $K_{TC}$.

Further, if the number of symbols $N_{symbol}^{PRS}$ than is greater $K_{TC}$, the UE shall assume that the l'-th symbol in the positioning reference signal resource has the same RE location (or relative RE offset) as the (l'-$K_{TC}$)-th symbol, where l' is not less than $K_{TC}$, l'=0, 1 ... $N_{symbol}^{PRS}-1$, $N_{symbol}^{PRS}$ represents the number of symbols occupied by the resource, and l'=0 represents an index of the start symbol within this resource.

Specifically, the network side may configure one of the following comb structures:

For a comb-2 structure, the protocol stipulates a generation formula, such as formula (1) (there is only one), of the relative RE offset of each symbol in the positioning reference signal resource:

$$RE_{relative\_offset} = \left(\frac{l'\mod(K_{TC})}{2}\right) + K_{TC}/2 * l'\mod(2) \tag{1}$$

For a comb-4 structure, the protocol stipulates that a generation formula of the relative RE offset of each symbol in the positioning reference signal resource is one of formula (2) and formula (3).

Alternatively, the protocol stipulates a plurality of generation formulas, and the network side indicates to use one of the generation formulas. The plurality of generation formulas include formula (2) and formula (3):

$$RE_{relative\_offset} = \text{floor}\left(\frac{l'\mod(K_{TC})}{2}\right) + K_{TC}/2 * l'\mod(2) \tag{2}$$

$$RE_{relative\_offset} = l'\mod(K_{TC}) \tag{3}$$

For a comb-6 structure, the protocol stipulates that a generation formula of the relative RE offset of each symbol in the positioning reference signal resource is one of formula (5) to formula (7).

Alternatively, the protocol stipulates a plurality of generation formulas, and the network side indicates one of the generation formulas. The plurality of generation formulas include at least two of the formula (5) to formula (7):

$$RE_{relative\_offset} = \text{floor}\left(\frac{l'\mod(K_{TC})}{2}\right) + K_{TC}/2 * l'\mod(2) \tag{5}$$

$$RE_{relative\_offset} = \text{floor}\left(\frac{l'\mod(K_{TC})}{3}\right) + K_{TC}/3 * l'\mod(3) \tag{6}$$

$$RE_{relative\_offset} = l'\mod(K_{TC}) \tag{7}$$

For a comb-8 structure, the protocol stipulates that a generation formula of the relative RE offset of each symbol in the positioning reference signal resource is one of formula (10) to formula (13).

Alternatively, the protocol stipulates a plurality of generation formulas, and the network side indicates to use one of the formulas. The plurality of generation formulas include at least two of the formula (10) to formula (13):

$$RE_{relative\_offset} = \text{floor}\left(\frac{l'\mod(K_{TC})}{2}\right) + K_{TC}/2 * l'\mod(2) \tag{10}$$

$$RE_{relative\_offset} = \text{floor}\left(\frac{l'\mod(K_{TC})}{4}\right) + K_{TC}/4 * l'\mod(4) \tag{11}$$

$$RE_{relative\_offset} = \text{floor}\left(\frac{l'\mod(K_{TC})}{4}\right) + 2*\left(\text{floor}\left(\frac{l'\mod(K_{TC}/2)}{2}\right) + K_{TC}/4 * (l'\mod(K_{TC}/2))\mod(2)\right) \tag{12}$$

where formula (12) may be further optimized to the following formula:

$$RE_{relative\_offset} = \text{floor}\left(\frac{l'\mod(K_{TC})}{4}\right) + K_{TC}/4 * \text{floor}\left(\frac{l'\mod(4)}{2}\right) + K_{TC}/2 * l'\mod(2) \tag{13}$$

$$RE_{relative\_offset} = l'\mod(K_{TC})$$

For a comb-12 structure, the protocol stipulates that a generation formula of the relative RE offset of each symbol in the positioning reference signal resource is one of formula (17) to formula (24).

Alternatively, the protocol stipulates a plurality of generation formulas, and the network side indicates one of the generation formulas. The plurality of generation formulas include at least two of the formula (17) to formula (24):

$$RE_{relative\_offset} = \text{floor}\left(\frac{l'\mod(K_{TC})}{2}\right) + K_{TC}/2 * l'\mod(2) \tag{17}$$

$$RE_{relative\_offset} = \text{floor}\left(\frac{l'\mod(K_{TC})}{3}\right) + K_{TC}/3 * l'\mod(3) \tag{18}$$

$$RE_{relative\_offset} = \text{floor}\left(\frac{l'\mod(K_{TC})}{4}\right) + 3*\left(\text{floor}\left(\frac{l'\mod(K_{TC}/3)}{2}\right) + K_{TC}/6 * (l'\mod(K_{TC}/3))\mod(2)\right) \tag{19}$$

where formula (19) may be further optimized to the following formula:

$$RE_{relative\_offset} = \text{floor}\left(\frac{l'\mod(K_{TC})}{4}\right) + K_{TC}/4 * \text{floor}\left(\frac{l'\mod(4)}{2}\right) + K_{TC}/2 * l'\mod(2)$$

$$RE_{relative\_offset} = \text{floor}\left(\frac{l'\mod(K_{TC})}{4}\right) + K_{TC}/4 * l'\mod(4) \tag{20}$$

$$RE_{relative\_offset} = \text{floor}\left(\frac{l'\mod(K_{TC})}{6}\right) + K_{TC}/6 * l'\mod(6) \tag{21}$$

$$RE_{relative\_offset} = \text{floor}\left(\frac{l'\mod(K_{TC})}{6}\right) + 2*\left(\text{floor}\left(\frac{l'\mod(K_{TC}/2)}{2}\right) + K_{TC}/4 * (l'\mod(K_{TC}/2))\mod(2)\right) \tag{22}$$

where formula (22) may be further optimized to the following formula:

$$RE_{relative\_offset} = \text{floor}\left(\frac{l'\mod(K_{TC})}{6}\right) + \frac{K_{TC}}{6} * \text{floor}\left(\frac{l'\mod(6)}{2}\right) + K_{TC}/2 * l'\mod(2)$$

$$RE_{relative_{offset}} = \text{floor}\left(\frac{l'\text{mod}(K_{TC})}{6}\right) + \qquad (23)$$
$$2*\left(\text{floor}\left(\frac{l'\text{mod}(K_{TC}/2)}{3}\right) + K_{TC}/6*(l'\text{mod}(K_{TC}/2))\text{mod}(3)\right)$$

where formula (23) may be further optimized to the following formula:

$$RE_{relative_{offset}} =$$
$$\text{floor}\left(\frac{l'\text{mod}(K_{TC})}{6}\right) + \frac{K_{TC}}{6}*\text{floor}\left(\frac{l'\text{mod}(6)}{3}\right) + K_{TC}/3*l'\text{mod}(3)$$

$$RE_{relative\_offset} = l'\text{mod}(K_{TC}) \qquad (24)$$

Implementation 3

This implementation indicates a relative RE offset of the positioning reference signal when an equivalent comb size is not 1. In this case, overheads can be reduced.

According to the protocol and/or indication from the network side, the UE uses a generation formula to derive a relative RE offset of each symbol in the positioning reference signal resource. According to the generation formula, the UE may generate the relative RE offset of each symbol in the positioning reference signal resource. The generation formula is associated with a comb structure of the positioning reference signal resource, a symbol index within the resource, and the number of symbols in the resource, l' represents a symbol index within the resource, and l'=0, 1 ... $N_{symbol}^{PRS}-1$, where $N_{symbol}^{PRS}$ represents the number of symbols occupied by the positioning reference signal resource, l'=0 represents an index of the start symbol within the positioning reference signal resource; and $K_{TC}$ represents a comb size of the positioning reference signal resource.

Further, the number of symbols $N_{symbol}^{PRS}$ in the positioning reference signal resource configured by the network side is not less than X, where X represents a periodicity of the generation formula (or a periodicity of a sequence generated by the generation formula), which is one of the factors of $K_{TC}$.

Further, if the number of symbols $N_{symbol}^{PRS}$ is greater than X, the UE shall assume that the l'-th symbol in the positioning reference signal resource has the same RE location (or relative RE offset) as the (l'-X)-th symbol, where l' is not less than $K_{TC}$, l'=0, 1 ... $N_{symbol}^{PRS}-1$, $N_{symbol}^{PRS}$ represents the number of symbols occupied by the positioning reference signal resource, and l'=0 represents an index of the start symbol within the positioning reference signal resource. To be specific, a relative RE offset corresponding to the l'-th symbol in the positioning reference signal resource has the same value as a relative RE offset of a symbol whose index is l' mod(X) in the positioning reference signal resource.

For a comb-4 structure, the protocol stipulates or the network side indicates that a generation formula of a relative RE offset of each symbol in the positioning reference signal resource is formula (32), corresponding to pattern configuration 3. In this case, X is 2.

$$RE_{relative\_offset} = K_{TC}/2*l'\text{mod}(2) \qquad (32)$$

For a comb-6 structure, the protocol stipulates or the network side indicates that a generation formula of a relative RE offset of each symbol in the positioning reference signal resource is one of formula (33) and formula (34), corresponding to pattern configuration 4 and pattern configuration 5. In this case, X is 3 and 2, respectively.

$$RE_{relative\_offset} = K_{TC}/3*l'\text{mod}(3) \qquad (33)$$

$$RE_{relative\_offset} = K_{TC}/2*l'\text{mod}(2) \qquad (34)$$

For a comb-8 structure, the protocol stipulates or the network side indicates that a generation formula of a relative RE offset of each symbol in the positioning reference signal resource is one of formula (35) to formula (37), corresponding to pattern configuration 5, pattern configuration 6, and pattern configuration 7. In this case, X is 4, 4, and 2, respectively.

$$RE_{relative\_offset} = \qquad (35)$$
$$2*\left(\text{floor}\left(\frac{l'\text{mod}(K_{TC}/2)}{2}\right) + K_{TC}/4*(l'\text{mod}(K_{TC}/2))\text{mod}(2)\right)$$

where formula (35) may be further optimized to the following formula:

$$RE_{relative\_offset} = K_{TC}/4*\text{floor}\left(\frac{l'\text{mod}(4)}{2}\right) + K_{TC}/2*l'\text{mod}(2)$$

$$RE_{relative\_offset} = K_{TC}/4*l'\text{mod}(4) \qquad (36)$$

$$RE_{relative\_offset} = K_{TC}/2*l'\text{mod}(2) \qquad (37)$$

For a comb-12 structure, the protocol stipulates or the network side indicates that a generation formula of a relative RE offset of each symbol in the positioning reference signal resource is one of formula (38) to formula (44), corresponding to pattern configuration 9, pattern configuration 10, pattern configuration 11, pattern configuration 12, pattern configuration 13, pattern configuration 14, and pattern configuration 15. In this case, X is 6, 6, 6, 4, 4, 3, and 2, respectively.

$$RE_{relative\_offset} = K_{TC}/6*l'\text{mod}(6) \qquad (38)$$

$$RE_{relative\_offset} = \qquad (39)$$
$$2*\left(\text{floor}\left(\frac{l'\text{mod}(K_{TC}/2)}{3}\right) + K_{TC}/6*(l'\text{mod}(K_{TC}/2))\text{mod}(3)\right)$$

where formula (39) may be further optimized to the following formula:

$$RE_{relative\_offset} = \frac{K_{TC}}{6}*\text{floor}\left(\frac{l'\text{mod}(6)}{3}\right) + K_{TC}/3*l'\text{mod}(3) \qquad (40)$$

$$RE_{relative\_offset} =$$
$$2*\left(\text{floor}\left(\frac{l'\text{mod}(K_{TC}/2)}{2}\right) + K_{TC}/4*(l'\text{mod}(K_{TC}/2))\text{mod}(2)\right)$$

where formula (40) may be further optimized to the following formula:

$$RE_{relative\_offset} = \frac{K_{TC}}{6} * \text{floor}\left(\frac{l' \text{mod}(6)}{2}\right) +$$
$$\frac{K_{TC}}{2} * l' \text{mod}(2) RE_{relative_{offset}} + K_{TC}/4 * l' \text{mod}(4)$$

$$RE_{relative\_offset} = K_{TC}/4 * l' \text{mod}(4) \qquad (41)$$

$$RE_{relative\_offset} = \qquad (42)$$
$$3 * \left(\text{floor}\left(\frac{l' \text{mod}(K_{TC}/3)}{2}\right) + 2 * (l' \text{mod}(K_{TC}/3)) \text{mod}(2)\right)$$

where formula (42) may be further optimized to the following formula:

$$RE_{relative\_offset} = K_{TC}/4 * \text{floor}\left(\frac{l' \text{mod}(4)}{2}\right) + K_{TC}/2 * l' \text{mod}(2)$$

$$Re_{relative\_offset} = K_{TC}/3 * l' \text{mod}(3) \qquad (43)$$

$$Re_{relative\_offset} = K_{TC}/2 * l' \text{mod}(2) \qquad (44)$$

Implementation 4

This Implementation 4 is applicable to downlink positioning reference signal resources. According to the generation formula (45) or (46) or (47), the UE may generate the relative RE offset of each symbol in the positioning reference signal resource; and $l'=0, 1 \ldots N_{symbol}^{PRS}-1$, where $N_{symbol}^{PRS}$ represents the number of symbols occupied by the downlink positioning reference signal resource, $l'=0$ represents an index of the start symbol within the downlink positioning reference signal resource.

$$RE_{relative\_offset} = \text{floor}\left(\frac{l' \text{mod}(K_{TC})}{2}\right) + K_{TC}/2 * l' \text{mod}(2) \qquad (45)$$

$$RE_{relative\_offset} = l' \text{mod}(K_{TC}) \text{ or} \qquad (46)$$

$$RE_{relative\_offset} = \text{floor}\left(\frac{l' \text{mod}(K_{TC})}{4 + K_{TC} \text{mod}(4)}\right) + \qquad (47)$$
$$\text{floor}\left(\frac{K_{TC}}{4}\right) * \text{floor}\left(\frac{l' \text{mod}(4 + K_{TC} \text{mod}(4))}{2}\right) + K_{TC}/2 * l' \text{mod}(2)$$

where l' represents a symbol index within the resource, $l'=0, 1 \ldots N_{symbol}^{PRS}-1$, $N_{symbol}^{PRS}$ represents the number of symbols occupied by the resource, $K_{TC}$ represents a comb size of the resource, and $RE_{relative\_offset}$ represents a relative resource element offset of each symbol in the positioning reference signal; and $l'=0$, represents the relative resource element offset of each symbol in the positioning reference signal.

Implementation 5

This Implementation 5 is applicable to uplink positioning reference signal resources. According to the generation formula in Implementation 5, the UE may generate the relative RE offset of each symbol in the positioning reference signal resource; and $l'=0, 1 \ldots N_{symbol}^{PRS}-1$, where $N_{symbol}^{PRS}$ represents the number of symbols occupied by the resource, $l'=0$ represents an index of the start symbol within this resource.

Specifically, the generation formula includes any one of the following:

$$RE_{relative\_offset} = \text{floor}\left(\frac{l' \text{mod}(K_{TC})}{2}\right) + K_{TC}/2 * l' \text{mod}(2)$$

or $$RE_{relative\_offset} = l' \text{mod}(K_{TC})$$

or $$RE_{relative\_offset} =$$
$$\text{floor}\left(\frac{l' \text{mod}(K_{TC})}{4}\right) + \text{floor}\left(\frac{K_{TC}}{4}\right) * \text{floor}\left(\frac{l' \text{mod}(4)}{2}\right) + K_{TC}/2 * l' \text{mod}(2)$$

where l' represents a symbol index within the resource, $l'=0, 1 \ldots N_{symbol}^{PRS}-1$, $N_{symbol}^{PRS}$ represents the number of symbols occupied by the resource, $K_{TC}$ represents a comb size of the resource, and $RE_{relative\_offset}$ represents a relative resource element offset of each symbol in the positioning reference signal; and $l'=0$, represents the relative resource element offset of each symbol in the positioning reference signal.

Alternatively, for different comb sizes, the generation formula is as follows:

For comb-2 and comb-4:

$$RE_{relative\_offset} = \text{floor}\left(\frac{l' \text{mod}(K_{TC})}{2}\right) + K_{TC}/2 * l' \text{mod}(2)$$

For comb-8:

$$RE_{relative\_offset} = \text{floor}\left(\frac{l' \text{mod}(K_{TC})}{4}\right) +$$
$$2 * (\text{floor}\left(\frac{l' \text{mod}(K_{TC}/2)}{2}\right) + K_{TC}/4 * (l' \text{mod}(K_{TC}/2))(2))$$

where the generation formula of comb-8 may be further optimized to:

$$RE_{relative\_offset} =$$
$$\text{floor}\left(\frac{l' \text{mod}(K_{TC})}{4}\right) + K_{TC}/4 * \text{floor}\left(\frac{l' \text{mod}(4)}{2}\right) + K_{TC}/2 * l' \text{mod}(2)$$

Implementation 6

For different comb sizes, the protocol stipulates a generation formula, a configuration in the table, or an array.

The UE selects a corresponding generation formula, configuration in the table, or array according to the comb size configured by the network side.

The solution of using a formula, table, or array is as follows:

(1) For each comb size, a generation formula is stipulated by the protocol. The UE selects a corresponding generation formula according to the comb size configured by the network side. The network side may configure one of the following comb structures:

Specifically, for comb-2, a generation formula stipulated by the protocol is:

$$RE_{relative\_offset} = \text{floor}\left(\frac{l' \text{mod}(K_{TC})}{2}\right) + K_{TC}/2 * l' \text{mod}(2)$$

For comb-4, a formula stipulated by the protocol is one of the following:

$$RE_{relative\_offset} = floor\left(\frac{l'\mod(K_{TC})}{2}\right) + K_{TC}/2 * l'\mod(2)$$

$$RE_{relative\_offset} = l'\mod(K_{TC})$$

For comb-6, a generation formula stipulated by the protocol is one of the following:

$$RE_{relative\_offset} = floor\left(\frac{l'\mod(K_{TC})}{2}\right) + K_{TC}/2 * l'\mod(2)$$

$$RE_{relative\_offset} = floor\left(\frac{l'\mod(K_{TC})}{3}\right) + K_{TC}/3 * l'\mod(3)$$

$$RE_{relative\_offset} = l'\mod(K_{TC})$$

For comb-8, a generation formula stipulated by the protocol is one of the following:

$$RE_{relative\_offset} = floor\left(\frac{l'\mod(K_{TC})}{2}\right) + K_{TC}/2 * l'\mod(2)$$

$$RE_{relative\_offset} = floor\left(\frac{l'\mod(K_{TC})}{4}\right) + K_{TC}/4 * l'\mod(4)$$

$$RE_{relative\_offset} = floor\left(\frac{l'\mod(K_{TC})}{4}\right) + 2*(floor\left(\frac{l'\mod(K_{TC}/2)}{2}\right) + K_{TC}/4 * (l'\mod(K_{TC}/2))(2))$$

$$RE_{relative\_offset} = l'\mod(K_{TC})$$

For comb-12, a generation formula stipulated by the protocol is one of the following:

$$RE_{relative\_offset} = floor\left(\frac{l'\mod(K_{TC})}{2}\right) + K_{TC}/2 * l'\mod(2)$$

$$RE_{relative\_offset} = floor\left(\frac{l'\mod(K_{TC})}{3}\right) + K_{TC}/3 * l'\mod(3)$$

$$RE_{relative\_offset} = floor\left(\frac{l'\mod(K_{TC})}{4}\right) + 3*(floor\left(\frac{l'\mod(K_{TC}/3)}{2}\right) + K_{TC}/6 * (l'\mod(K_{TC}/3))(2))$$

$$RE_{relative\_offset} = floor\left(\frac{l'\mod(K_{TC})}{4}\right) + K_{TC}/4 * l'\mod(4)$$

$$RE_{relative\_offset} = floor\left(\frac{l'\mod(K_{TC})}{6}\right) + K_{TC}/6 * l'\mod(6)$$

$$RE_{relative\_offset} = floor\left(\frac{l'\mod(K_{TC})}{6}\right) + 2*(floor\left(\frac{l'\mod\left(\frac{K_{TC}}{2}\right)}{2}\right) + \frac{K_{TC}}{4} * \left(l'\mod\left(\frac{K_{TC}}{2}\right)\right)\mod(2))$$

$$RE_{relative\_offset} = floor\left(\frac{l'\mod(K_{TC})}{6}\right) + 2*(floor\left(\frac{l'\mod(K_{TC}/2)}{3}\right) + K_{TC}/6 * (l'\mod(K_{TC}/2))(3))$$

$$RE_{relative\_offset} = l'\mod(K_{TC})$$

(2) The protocol stipulates a table, and there are a plurality of configurations in the table, which correspond to relative RE offset configurations for different comb sizes. The UE selects a corresponding relative RE offset configuration according to the comb size configured by the network side, and then derives a relative RE offset of each symbol. The network side may configure one of the following comb structures:

| Comb size | Configuration corresponding to a relative RE offset |
|---|---|
| Comb-2 | {0, 1} |
| Comb-4 | {0, 2, 1, 3} or {0, 1, 2, 3} |
| Comb-6 | One of {0, 3, 1, 4, 2, 5}, {0, 2, 4, 1, 3, 5}, and {0, 1, 2, 3, 4, 5} |
| Comb-8 | One of {0, 4, 1, 5, 2, 6, 3, 7}, {0, 2, 4, 6, 1, 3, 5, 7}, {0, 4, 2, 6, 1, 5, 3, 7}, and {0, 1, 2, 3, 4, 5, 6, 7} |
| Comb-12 | One of {0, 6, 1, 7, 2, 8, 3, 9, 4, 10, 5, 11}, {0, 4, 8, 1, 5, 9, 2, 6, 10, 3, 7, 11}, {0, 6, 3, 9, 1, 7, 4, 10, 2, 8, 5, 11}, {0, 3, 6, 9, 1, 4, 7, 10, 2, 5, 8, 11}, {0, 2, 4, 6, 8, 10, 1, 3, 5, 7, 9, 11}, {0, 6, 2, 8, 4, 10, 1, 7, 3, 9, 5, 11}, {0, 4, 8, 2, 6, 10, 1, 5, 9, 3, 7, 11}, and {0, 1, 2, 3, 4, 5, 6, 7, 8, 9, 10, 11} |

(3) For each comb size, an array is stipulated by the protocol. The UE selects a corresponding array according to the comb size configured by the network side, and then derives a relative RE offset of each symbol. The network side may configure one of the following comb structures:

| Comb size | Array corresponding to a relative RE offset |
|---|---|
| Comb-2 | {0, 1} |
| Comb-4 | {0, 2, 1, 3} or {0, 1, 2, 3} |
| Comb-6 | One of {0, 3, 1, 4, 2, 5}, {0, 2, 4, 1, 3, 5}, and {0, 1, 2, 3, 4, 5} |
| Comb-8 | One of {0, 4, 1, 5, 2, 6, 3, 7}, {0, 2, 4, 6, 1, 3, 5, 7}, {0, 4, 2, 6, 1, 5, 3, 7}, and {0, 1, 2, 3, 4, 5, 6, 7} |
| Comb-12 | One of {0, 6, 1, 7, 2, 8, 3, 9, 4, 10, 5, 11}, {0, 4, 8, 1, 5, 9, 2, 6, 10, 3, 7, 11}, {0, 6, 3, 9, 1, 7, 4, 10, 2, 8, 5, 11}, {0, 3, 6, 9, 1, 4, 7, 10, 2, 8, 5, 11}, {0, 2, 4, 6, 8, 10, 1, 3, 5, 7, 9, 11}, {0, 6, 2, 8, 4, 10, 1, 7, 3, 9, 5, 11}, {0, 4, 8, 2, 6, 10, 1, 5, 9, 3, 7, 11}, and {0, 1, 2, 3, 4, 5, 6, 7, 8, 9, 10, 11} |

A comb size supported by the downlink positioning reference signal includes at least one of 2, 4, 6, 8, and 12, and a comb size supported by the uplink positioning reference signal includes at least one of 2, 4, and 8.

Implementation 7

For downlink positioning reference signal resources (DL PRS resources), the PRS mapping formula is:

For configured PRS resources, the UE assumes that a sequence r(m) is mapped to a resource element $(k, l)_\mu$:

$$a_{k,l}^{(\mu)} = \beta_{PRS} r_{l,n_{s,f}}(m')$$

where $$k = nN_{sc}^{RB} + (k_0 + K_{TC} * k' + RE_{relative\_offset}) \mod N_{sc}^{RB}$$

$$\rho_{PRS} = N_{sc}^{RB}/K_{TC}$$

$$RE_{relative\_offset} = A(l' \mod(N_{length}^{Array}))$$

$$k' = 0, 1, \ldots \rho_{PRS}$$

$$m' = \rho_{PRS} \cdot n + k'$$

$$n = 0, 1, \ldots$$

$$l = l_0 + l'$$

where $\beta_{PRS}$ is a power scaling factor; $K_{TC}$ is a comb size and is determined by PRS frequency density, $\rho_{PRS}$ is the PRS frequency density, $\rho_{PRS}=N_{sc}^{RB}/K_{TC}$; l is a PRS OFDM symbol index within a slot; $l_0$ is a symbol at which a PRS resource starts in the slot; l' is a symbol order counting from the start symbol in the order of PRS OFDM symbols, l'=0, l'=0, 1 . . . $N_{symbol}^{PRS}-1$, $N_{symbol}^{PRS}$ is the number of symbols in the PRS resource; $RE_{relative\_offset}$ is a relative offset of a symbol l' relative to a resource element offset of the first symbol in a downlink PRS resource; A is a configuration selected from the table or A is an array, A includes $N_{length}^{Array}$ numbers, and A may represent a relative resource element offset of the first $N_{length}^{Array}$ symbols in the downlink PRS resource; $k_0$ is a comb offset of the first symbol in the PRS resource, or is the lowest resource element location of the start symbol in the PRS resource and is associated with a PRS sequence ID $N_{ID}^{PRS}$; and a reference point for k=0 is subcarrier 0 in common resource block 0.

offset of a symbol l' relative to a resource element offset of the first symbol in a downlink PRS resource, and may be generated from a formula; $k_0$ is a comb offset of the first symbol in the PRS resource, or is the lowest resource element location of the start symbol in the PRS resource and is associated with a PRS sequence ID $N_{ID}^{PRS}$; and a reference point for k=0 is subcarrier 0 in common resource block 0.

Implementation 8

For uplink positioning reference signal resources, that is, SRS resources used for positioning, an SRS mapping formula is:

a start location of the SRS in frequency domain is determined by the following formula:

$$k_0^{(p_i)} = \bar{k}_0^{(p_i)} + \sum_{b=0}^{B_{SRS}} K_{TC} M_{sc,b}^{SRS} n_b$$

where $$k_{TC}^{(p_i)} = \begin{cases} (\bar{k}_{TC} + RE_{relative\_offset} + K_{TC}/2) \bmod K_{TC} & \text{if } n_{SRS}^{cs} \in \{n_{SRS}^{cs,max}/2, \ldots, n_{SRS}^{cs,max} - 1\} \text{ and } N_{ap}^{SRS} = 4 \text{ and } p_i \in \{1001, 1003\} \\ (\bar{k}_{TC} + RE_{relative\_offset}) \bmod K_{TC} & \text{otherwise} \end{cases}$$

$$RE_{relative\_offset} = A(l' \bmod(N_{length}^{Array}))$$

Alternatively, the PRS mapping formula is:

For configured PRS resources, the UE assumes that a sequence r(m) is mapped to a resource element $(k,l)_\mu$:

$$a_{k,l}^{(\mu)} = \beta_{PRS} r_{l,n_{sf}}(m')$$

where $k=nN_{sc}^{RB}+(k_0+K_{TC}*k'+RE_{relative\_offset}) \bmod N_{sc}^{RB}$ where is $\bar{k}_{TC}$ a comb offset, and represents the lowest resource element location of the first symbol in a resource block; $RE_{relative\_offset}$ is a relative offset of a symbol l' relative to a resource element offset of the first symbol in an SRS resource; A is a configuration selected from the table or A is an array, A includes $N_{length}^{Array}$ numbers, and A may represent a relative resource element offset of the first $N_{length}^{Array}$ symbols in the SRS resource; and l'=0, 1, . . . , $N_{symb}^{SRS}$ represents a symbol order counting from the start symbol of the SRS resource, and for the start symbol of the SRS resource, l'=0.

Alternatively, the generation formula is $$k_0^{(p_i)} = \bar{k}_0^{(p_i)} + \sum_{b=0}^{B_{SRS}} K_{TC} M_{sc,b}^{SRS} n_b$$

$$k_{TC}^{(p_i)} = \begin{cases} (\bar{k}_{TC} + RE_{relative\_offset} + K_{TC}/2) \bmod K_{TC} & \text{if } n_{SRS}^{cs} \in \{n_{SRS}^{cs,max}/2, \ldots, n_{SRS}^{cs,max} - 1\} \text{ and } N_{ap}^{SRS} = 4 \text{ and } p_i \in \{1001, 1003\} \\ (\bar{k}_{TC} + RE_{relative\_offset}) \bmod K_{TC} & \text{otherwise} \end{cases}$$

$\rho_{PRS}=N_{sc}^{RB}/K_{TC}$ $k'=0,1,\ldots \rho_{PRS}$ $m'=\rho_{PRS}\cdot n+k'$ $n=0,1,\ldots$ $l=l_0+l'$ $RE_{relative\_offset}=\ldots$ where $\beta_{PRS}$ is a power scaling factor; $K_{TC}$ is a comb size and is determined by PRS frequency density, $\rho_{PRS}$ is the PRS frequency density, $\rho_{PRS}=N_{sc}^{RB}/K_{TC}$; l is a PRS OFDM symbol index within a slot; $l_0$ is a symbol at which a PRS resource starts in the slot; l' is a symbol order counting from the start symbol in the order of PRS OFDM symbols, l'=0, l'=0, 1 . . . $N_{symbol}^{PRS}-1$, $N_{symbol}^{PRS}$ is the number of symbols in the PRS resource; $RE_{relative\_offset}$ is a relative where is $\bar{k}_{TC}$ a comb offset, and represents the lowest resource element location of the first symbol in a resource block; $RE_{relative\_offset}$ is a relative offset of a symbol l' relative to a resource element offset of the first symbol in an SRS resource, and may be generated from a formula; and l'=0, 1, . . . , $N_{symb}^{SRS}$ represents a symbol order counting from the start symbol of the SRS resource, and for the start symbol of the SRS resource, l'=0.

Implementation 9:

For different comb sizes, configurations and patterns of relative RE offsets are shown in FIG. 7 to FIG. 37, and FIG. 7 to FIG. 37 show PRS signal mapping in an RB.

Figure 7:
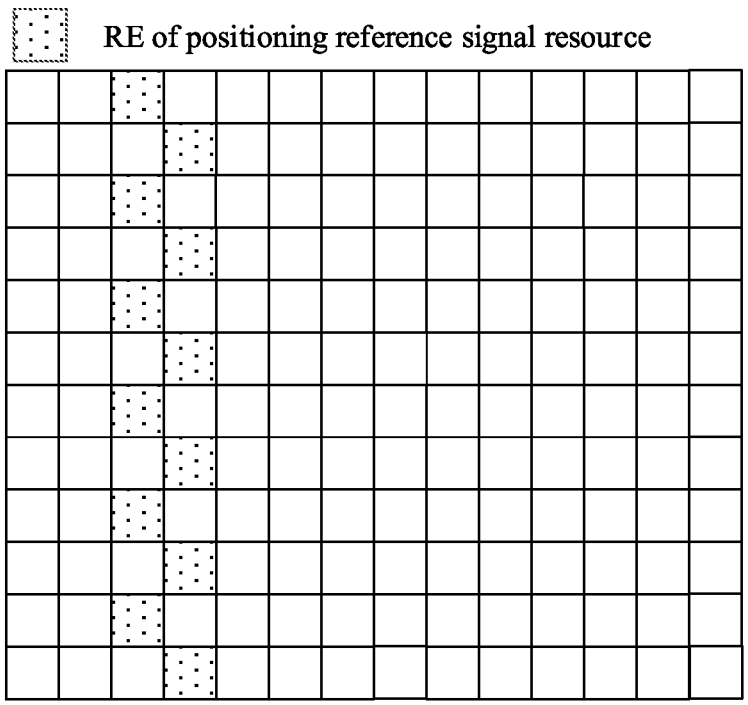
FIG. 7 to FIG. 37 are schematic diagrams of a resource element RE of a positioning reference signal resource according to an embodiment of this disclosure.

For comb-2, a configuration corresponding to a relative RE offset is {0, 1}, and as shown in FIG. 7, parts filled with dots are resource elements REs of the positioning reference signal resource.

Figure 8:
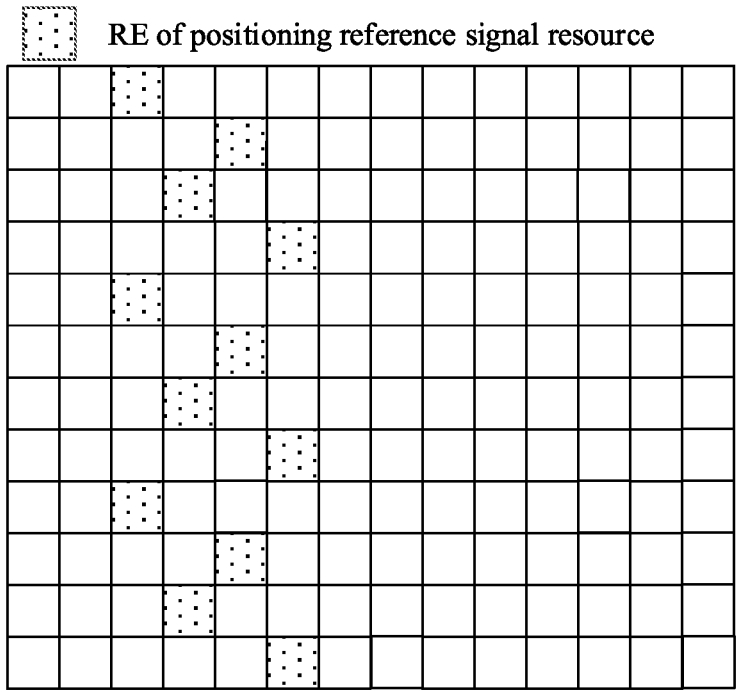
Figure 9:
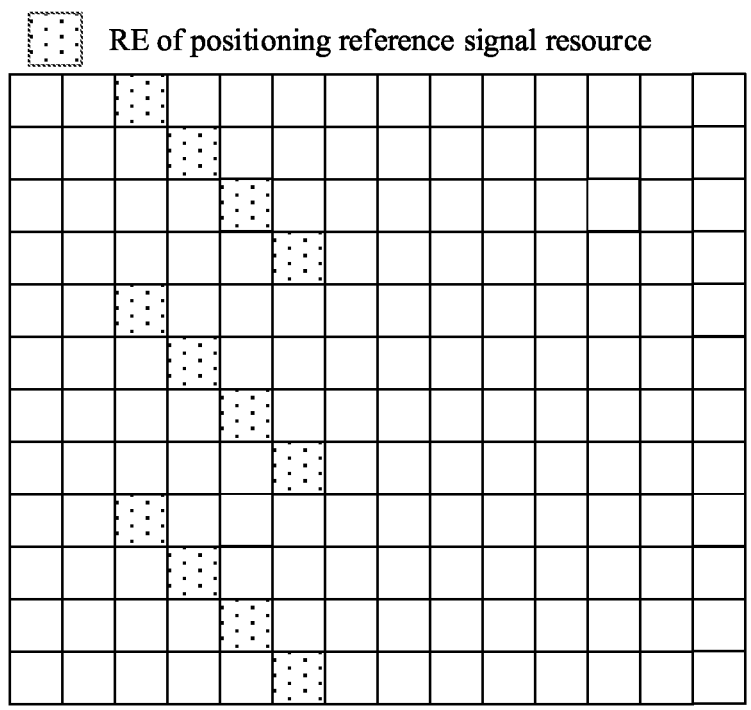
Figure 10:
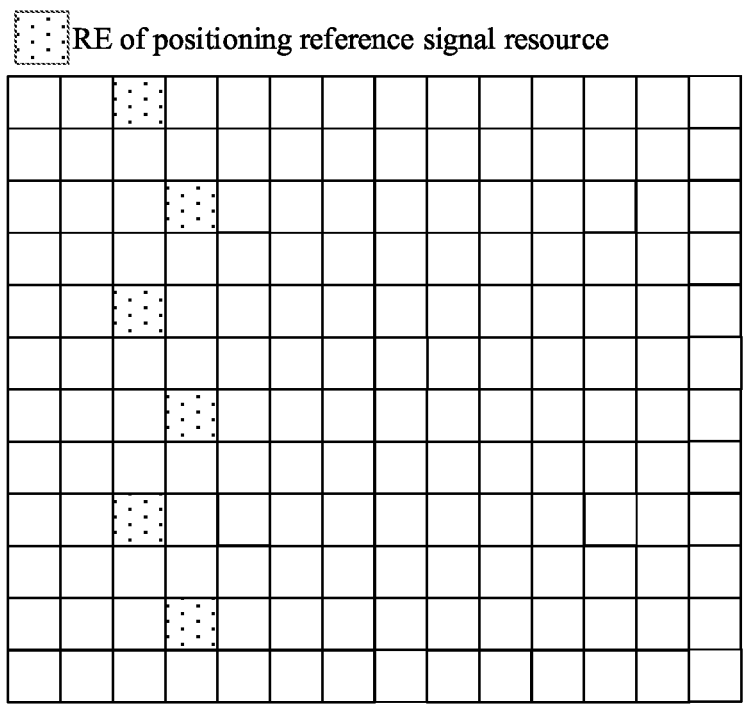

For comb-4, configuration 1 corresponding to a relative RE offset is {0, 2, 1, 3}, and as shown in FIG. 8, parts filled with dots are REs of the positioning reference signal resource; configuration 2 corresponding to a relative RE offset is {0, 1, 2, 3}, and as shown in FIG. 9, parts filled with dots are REs of the positioning reference signal resource; and configuration 3 corresponding to a relative RE offset is {0, 2}, and as shown in FIG. 10, parts filled with dots are REs of the positioning reference signal resource.

Figure 11:
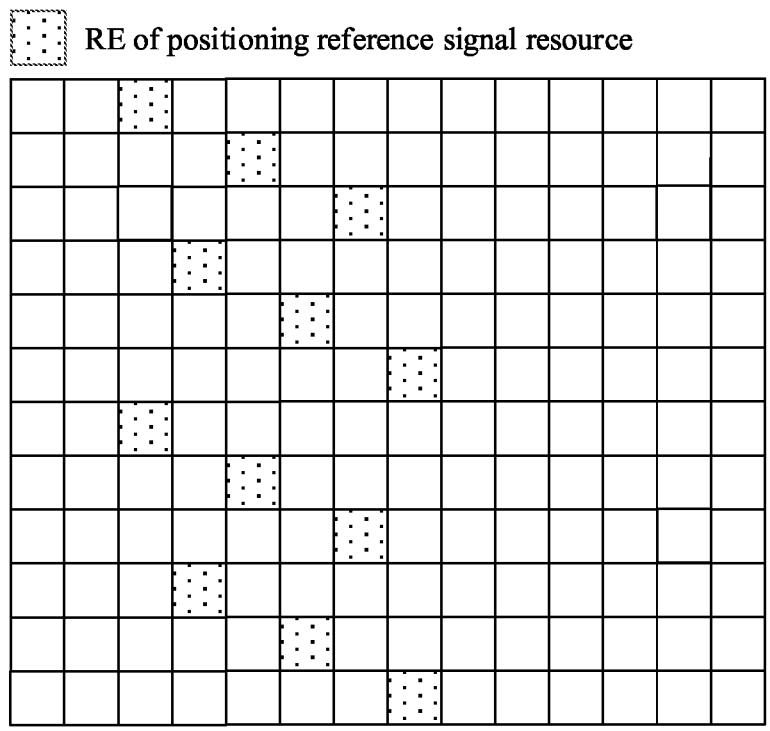
Figure 12:
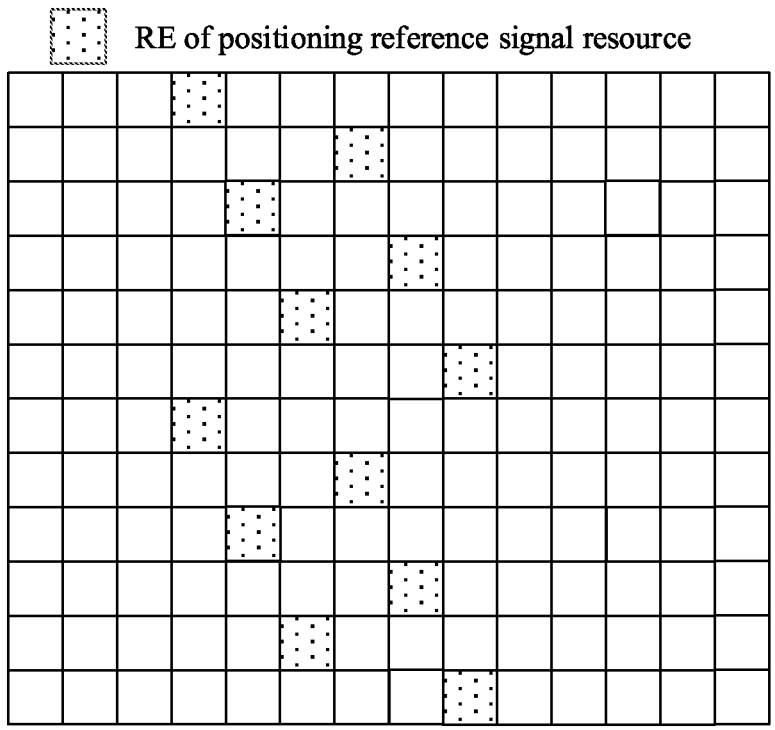
Figure 13:
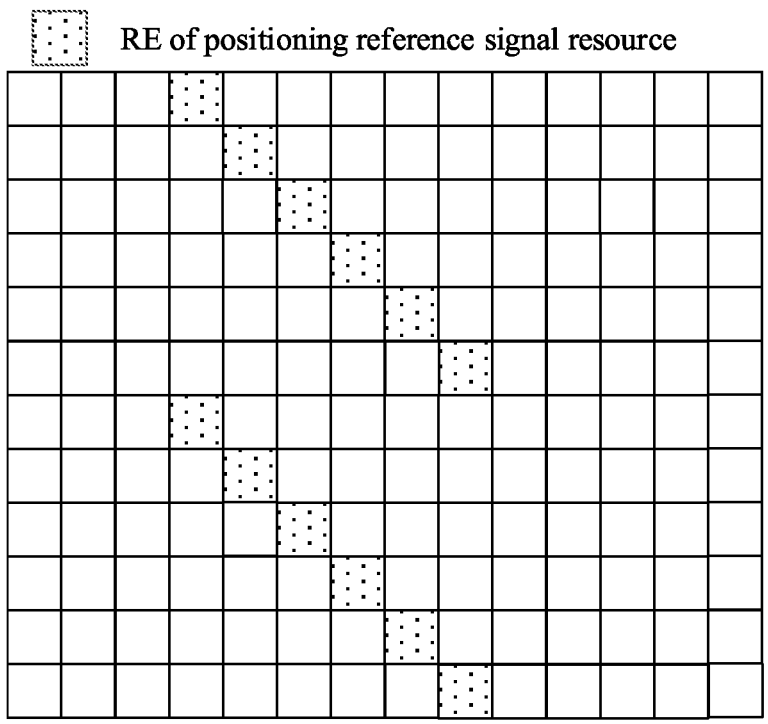
Figure 14:
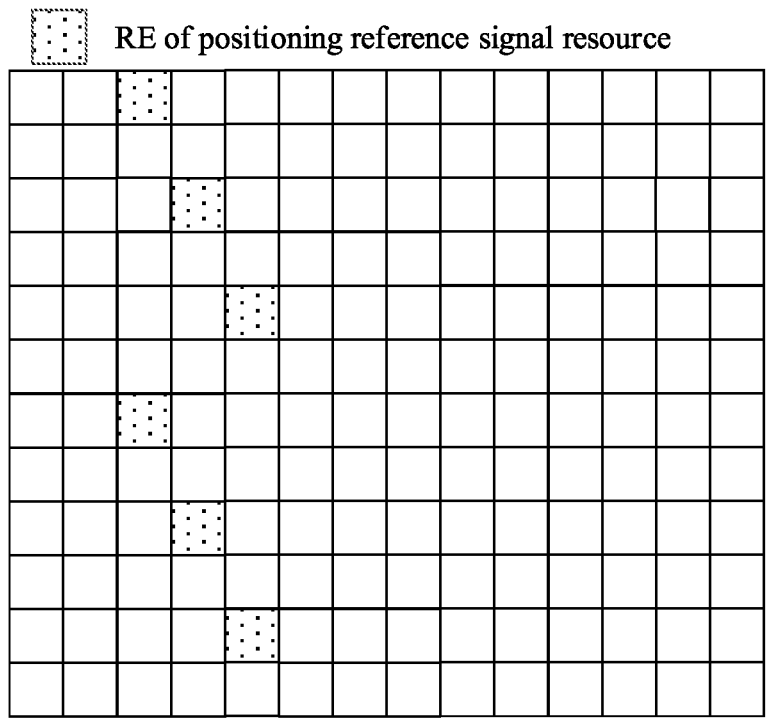
Figure 15:
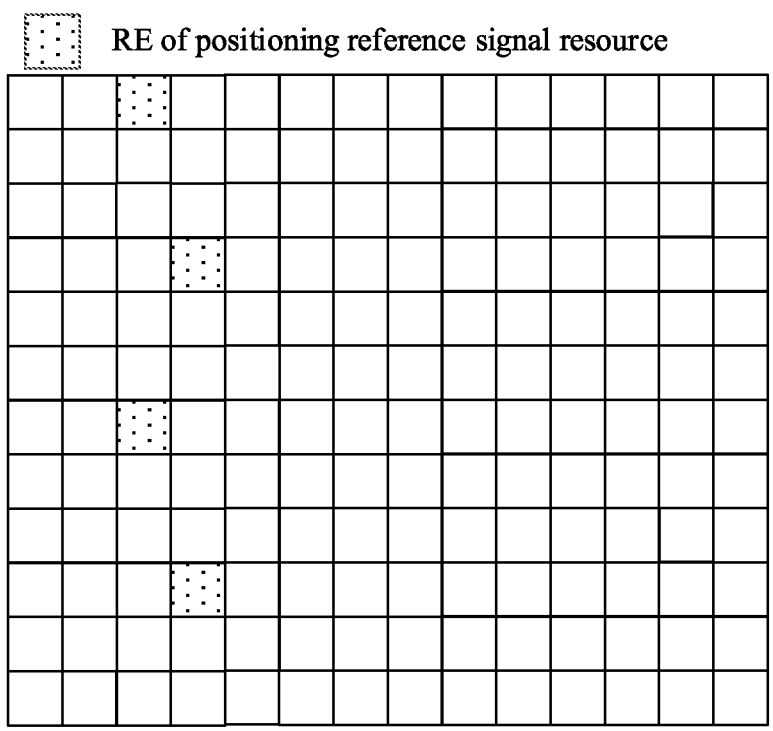

For comb-6, configuration 1 corresponding to a relative RE offset is {0, 2, 4, 1, 3, 5}, and as shown in FIG. 11, parts filled with dots are REs of the positioning reference signal resource; configuration 2 corresponding to a relative RE offset is {0, 3, 1, 4, 2, 5}, and as shown in FIG. 12, parts filled with dots are REs of the positioning reference signal resource; configuration 3 corresponding to a relative RE offset is {0, 1, 2, 3, 4, 5}, and as shown in FIG. 13, parts filled with dots are REs of the positioning reference signal resource; configuration 4 corresponding to a relative RE offset is {0, 2, 4}, and as shown in FIG. 14, parts filled with dots are REs of the positioning reference signal resource; and configuration 5 corresponding to a relative RE offset is {0, 3}, and as shown in FIG. 15, parts filled with the dots are REs of the positioning reference signal resource.

Figure 16:
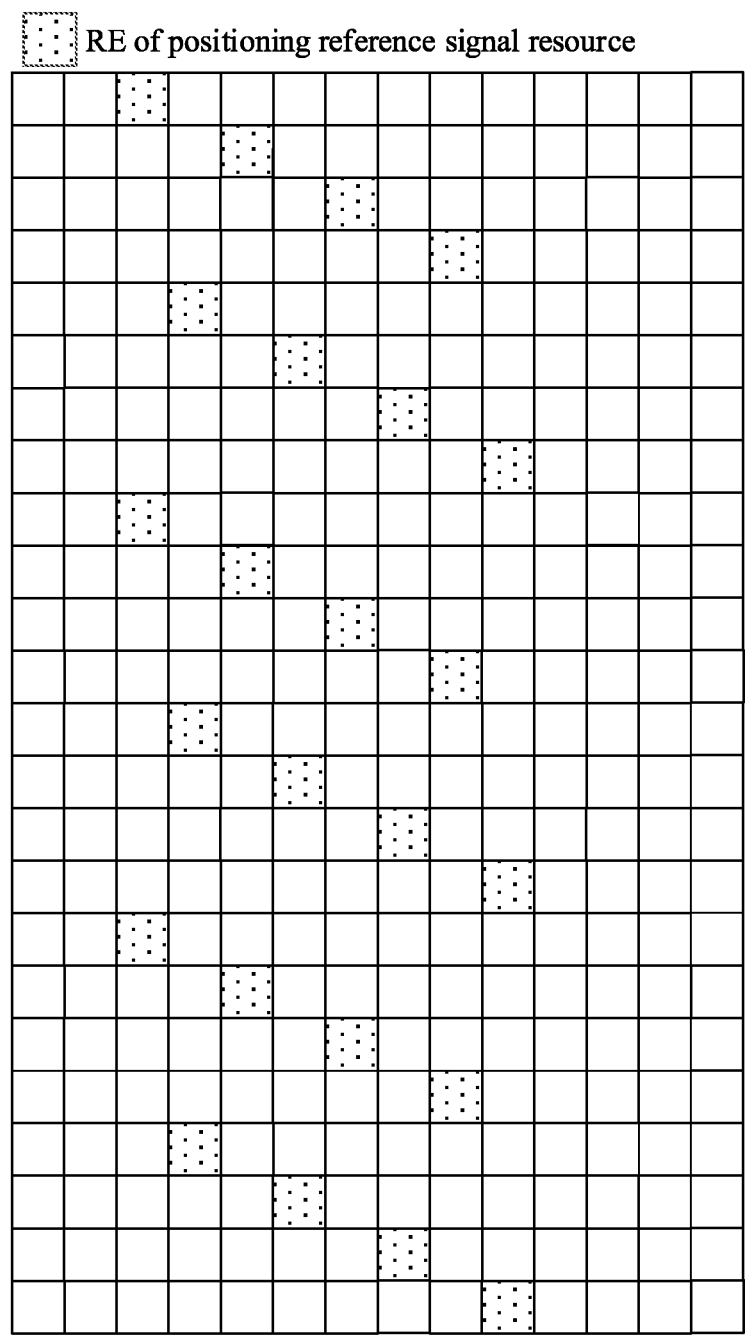
Figure 17:
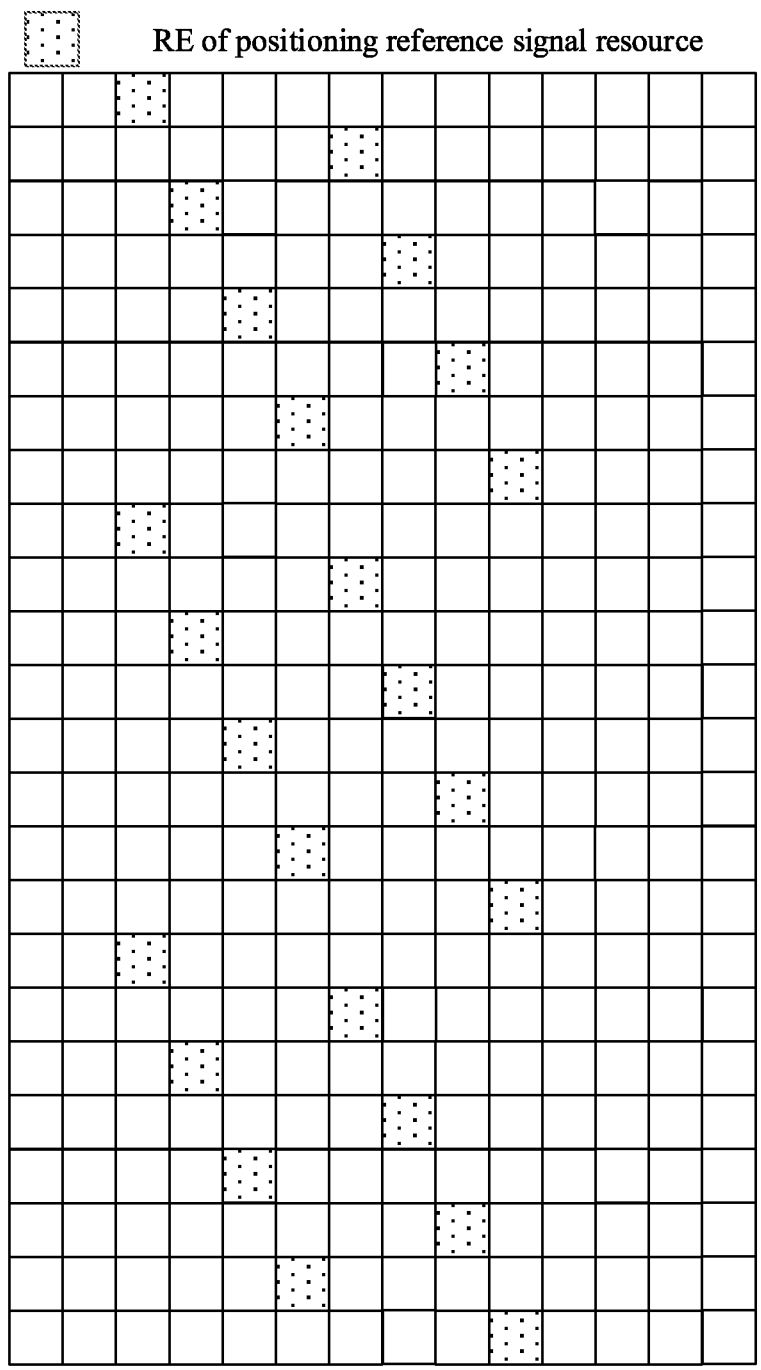
Figure 18:
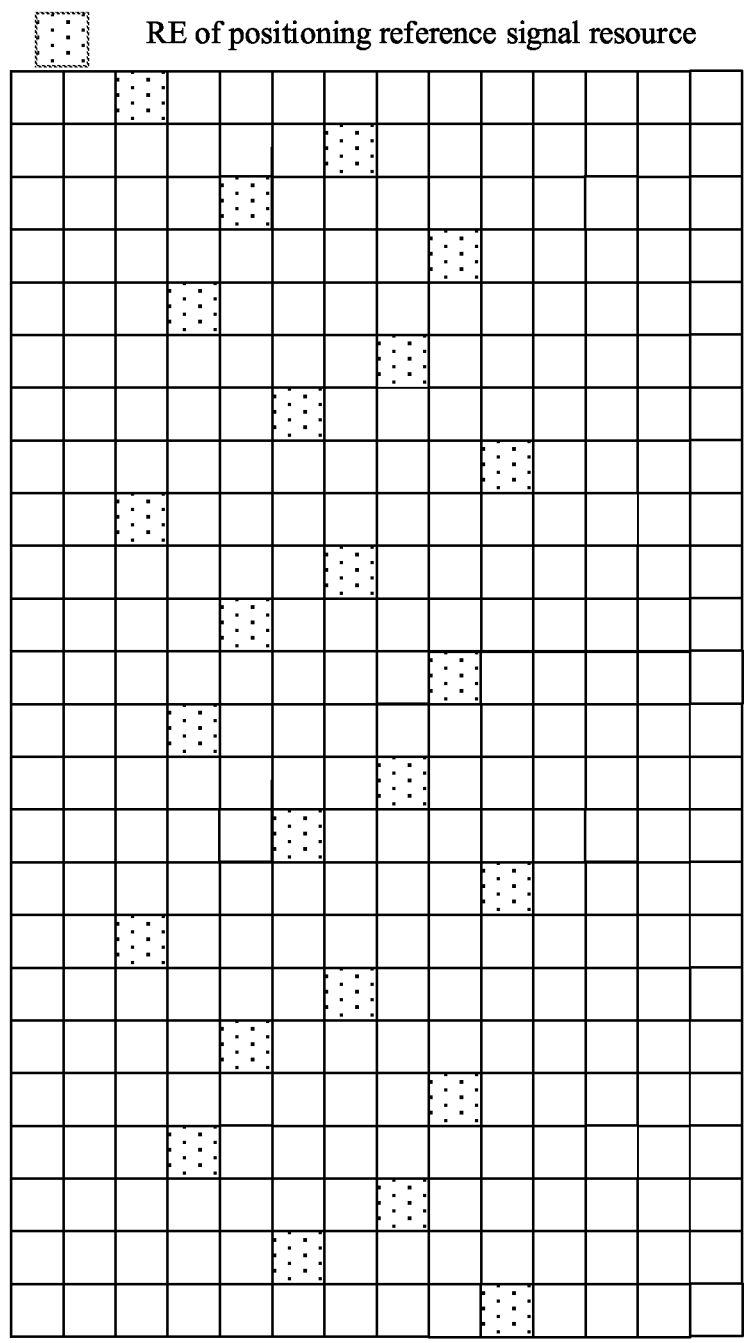
Figure 19:
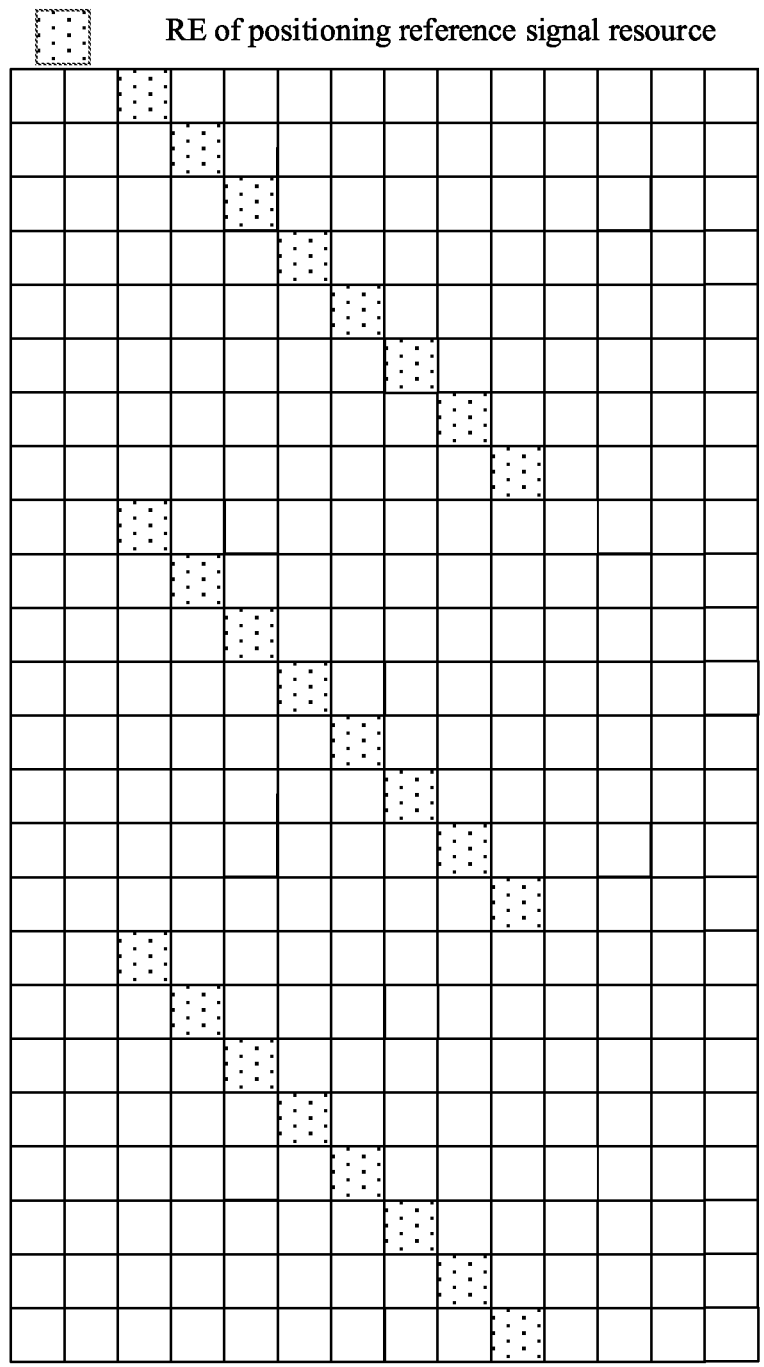
Figure 20:
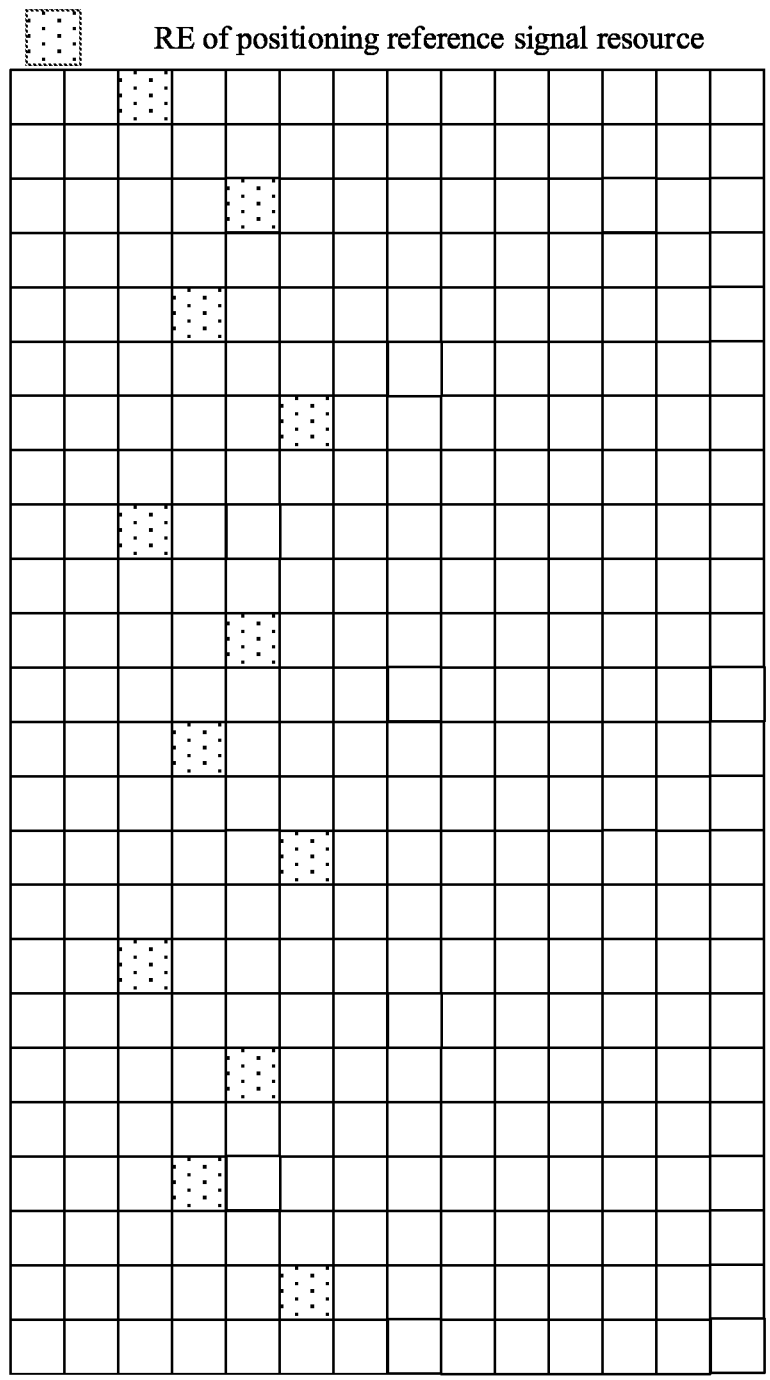
Figure 21:
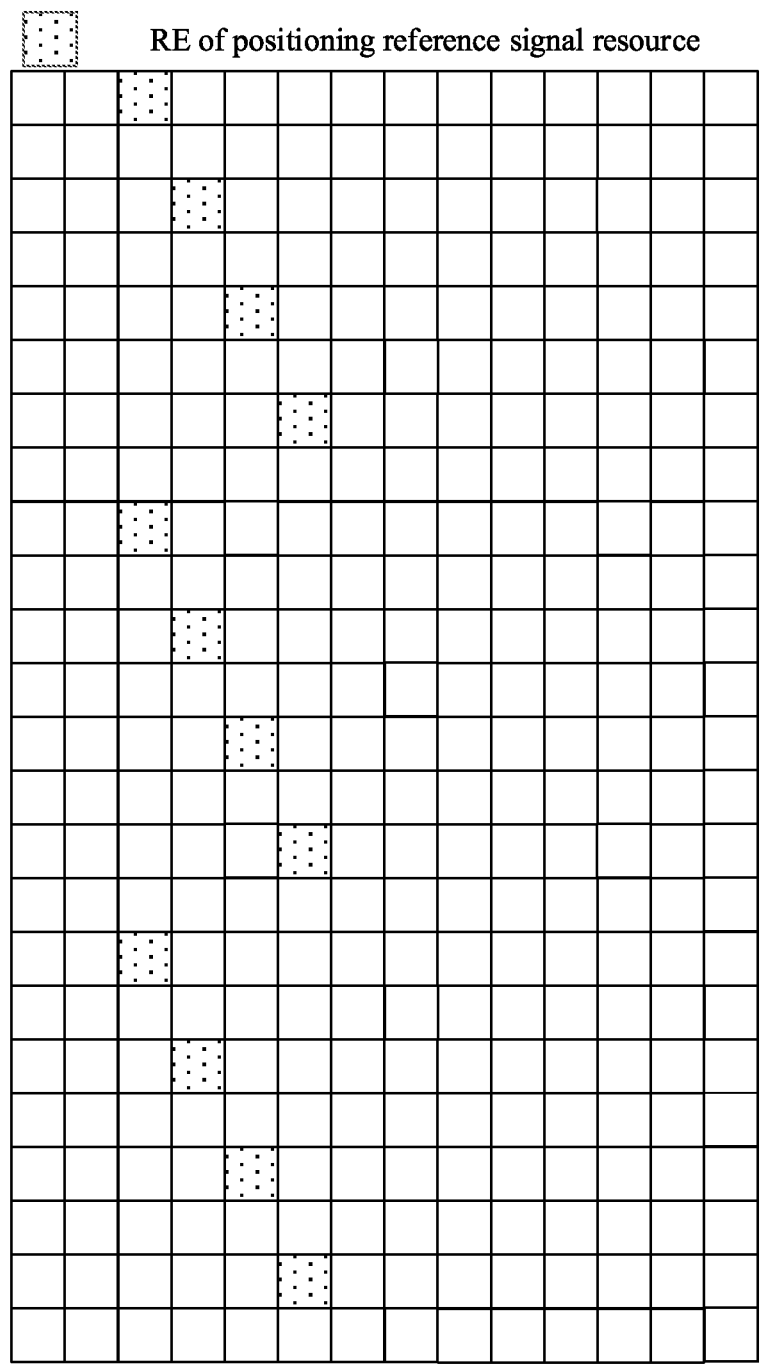
Figure 22:
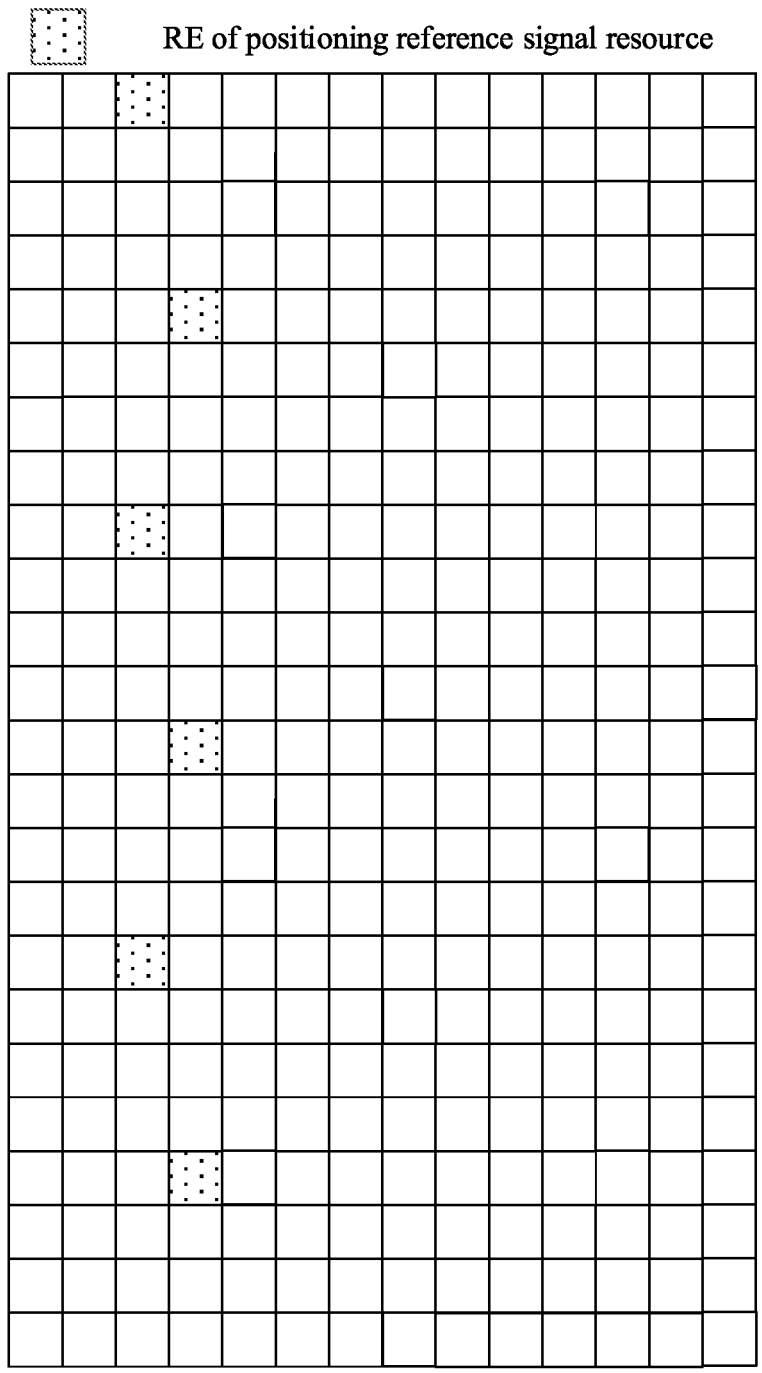

For comb-8, configuration 1 corresponding to a relative RE offset is {0, 4, 1, 5, 2, 6, 3, 7}, and as shown in FIG. 16, parts filled with dots are REs of the positioning reference signal resource; configuration 2 corresponding to a relative RE offset is {0, 2, 4, 6, 1, 3, 5, 7}, and as shown in FIG. 17, parts filled with dots are REs of the positioning reference signal resource; configuration 3 corresponding to a relative RE offset is {0, 4, 2, 6, 1, 5, 3, 7}, and as shown in FIG. 18, parts filled with dots are REs of the positioning reference signal resource; configuration 4 corresponding to a relative RE offset is {0, 1, 2, 3, 4, 5, 6, 7}, and as shown in FIG. 19, parts filled with dots are REs of the positioning reference signal resource; configuration 5 corresponding to a relative RE offset is {0, 4, 2, 6}, and as shown in FIG. 20, parts filled with dots are REs of the positioning reference signal resource; configuration 6 corresponding to a relative RE offset is {0, 2, 4, 6}, and as shown in FIG. 21, parts filled with dots are REs of the positioning reference signal resource; and configuration 7 corresponding to a relative RE offset is {0, 4}, and as shown in FIG. 22, parts filled with dots are REs of the positioning reference signal resource.

Figure 23:
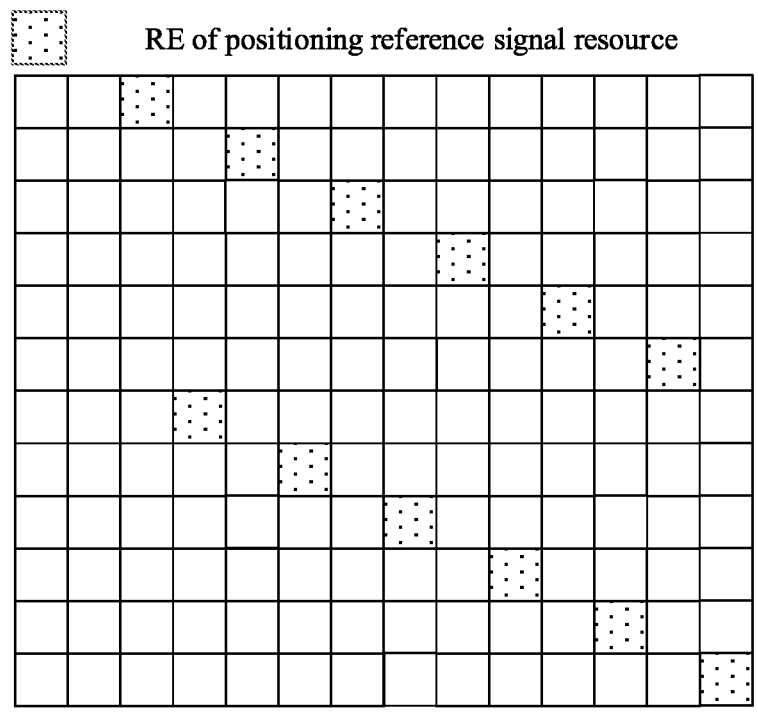
Figure 24:
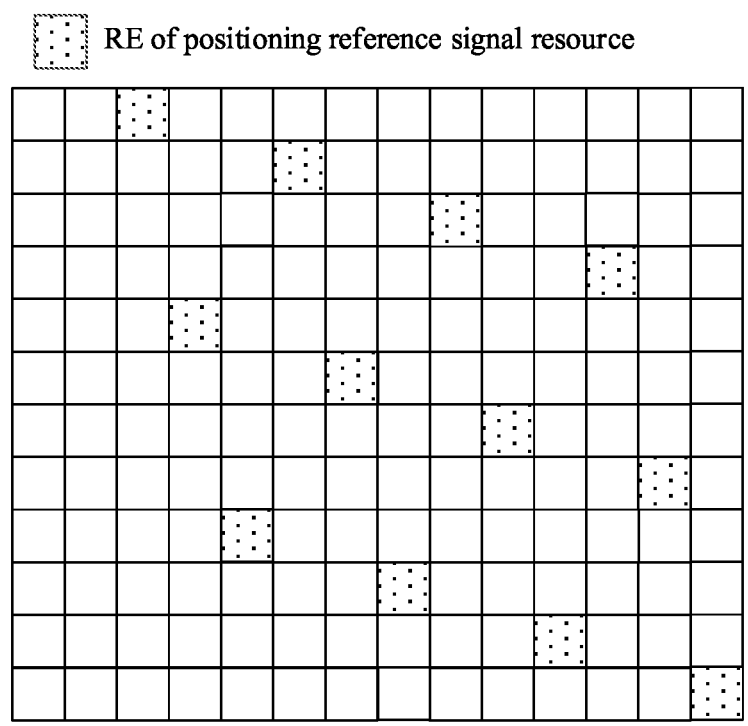
Figure 25:
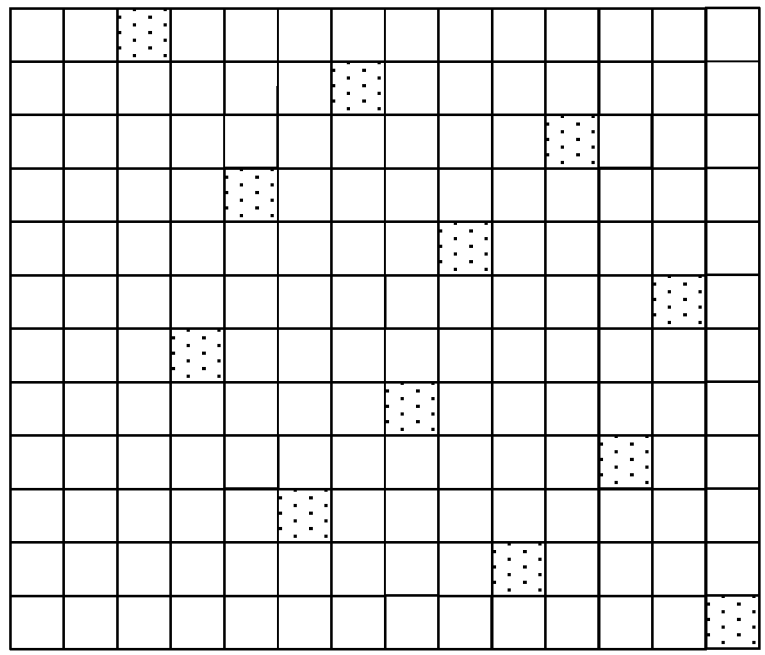
Figure 26:
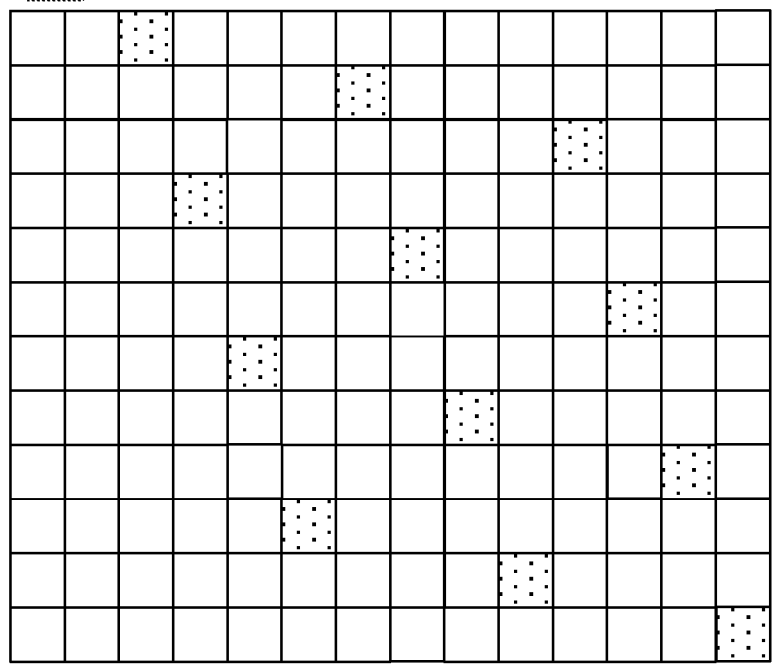
Figure 27:
Figure 27:
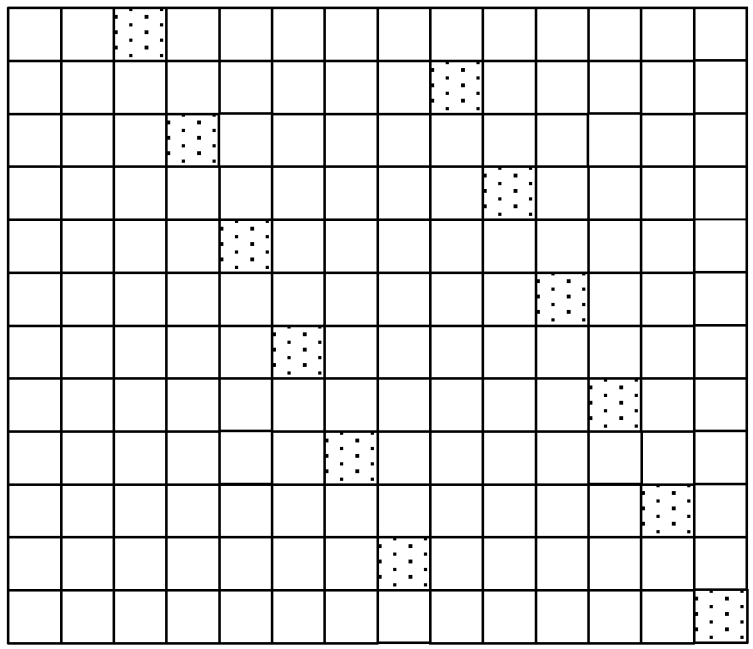
Figure 28:
Figure 28:
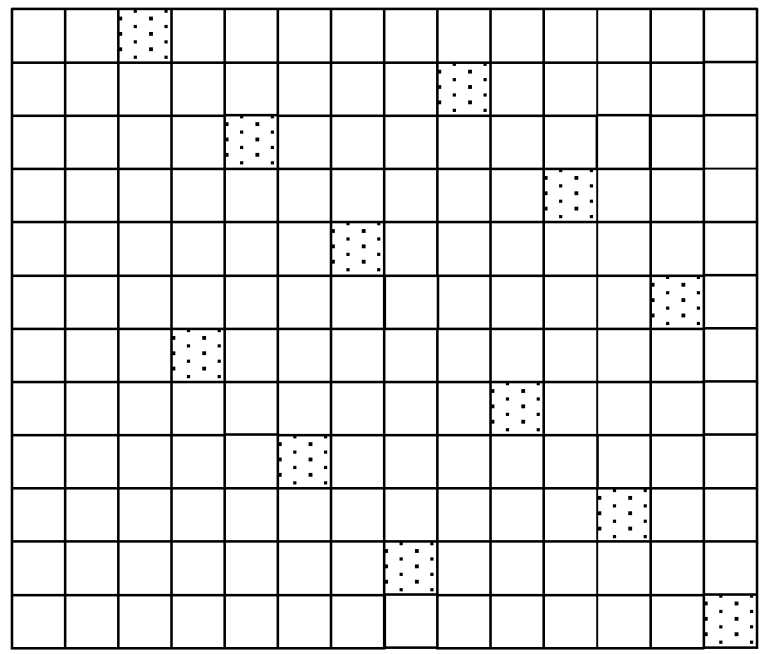
Figure 29:
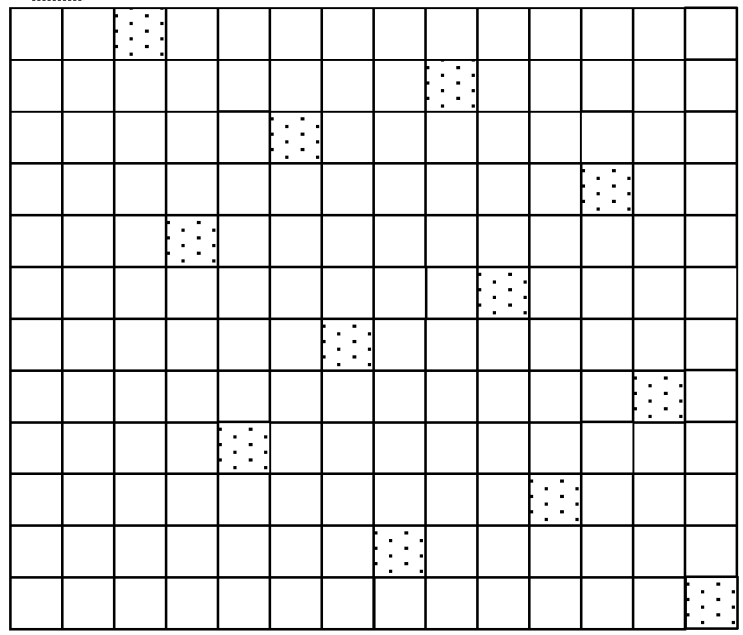
Figure 30:
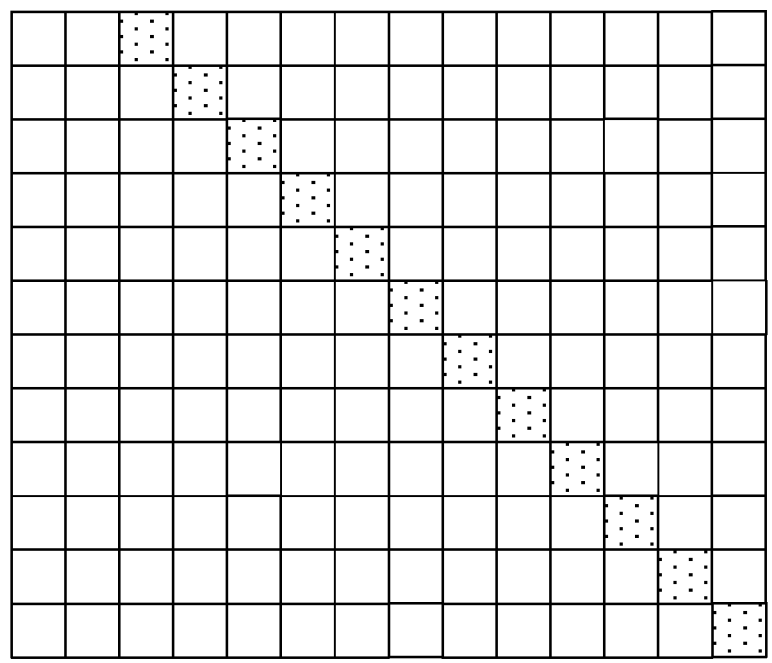
Figure 31:
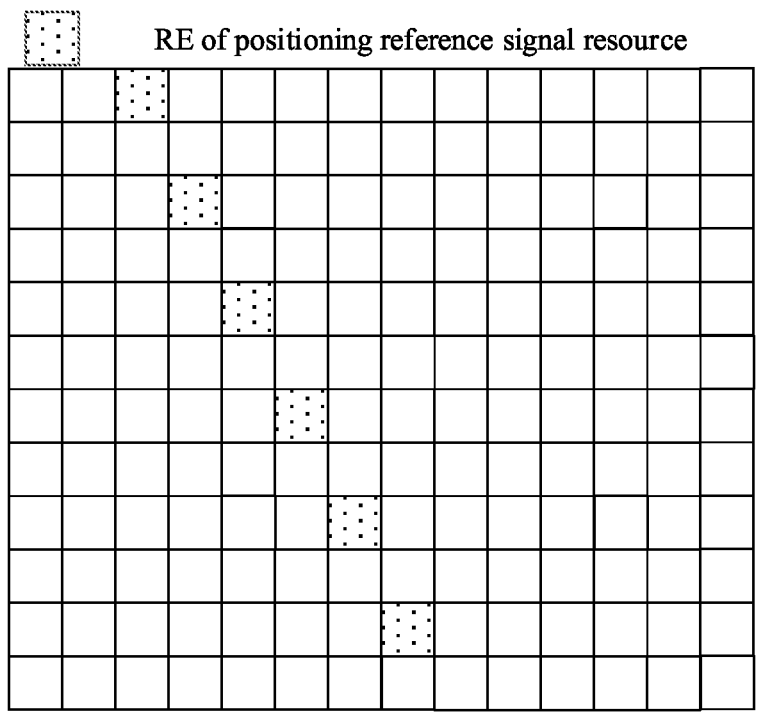
Figure 32:
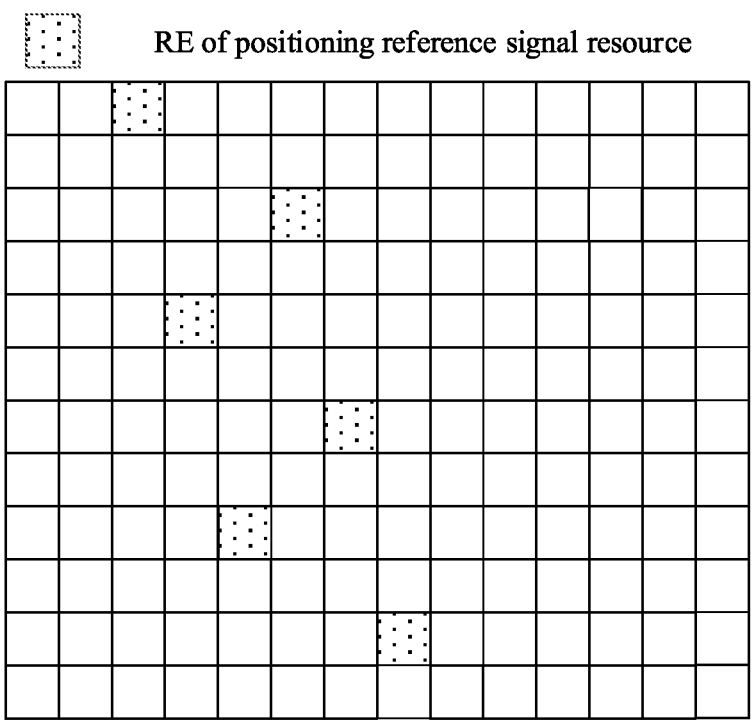
Figure 33:
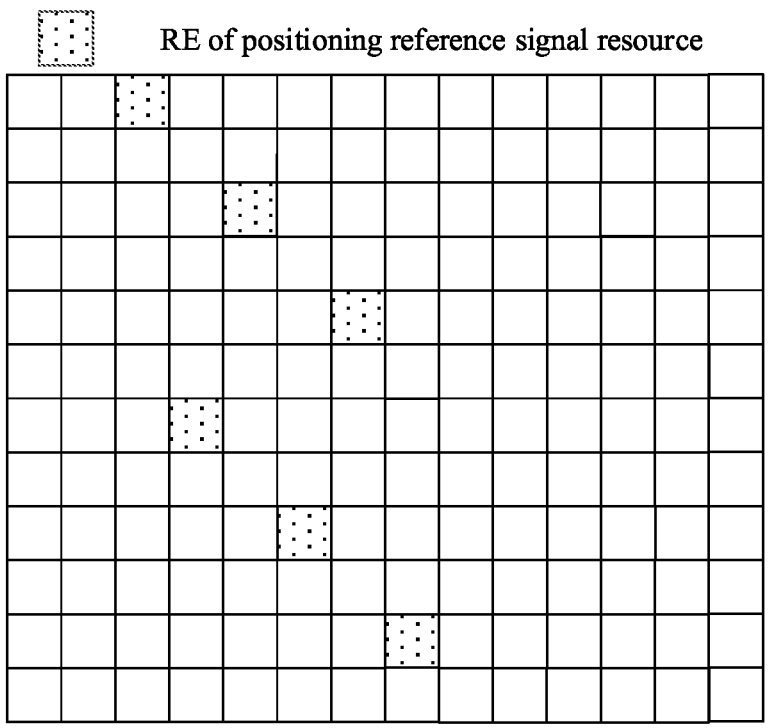
Figure 34:
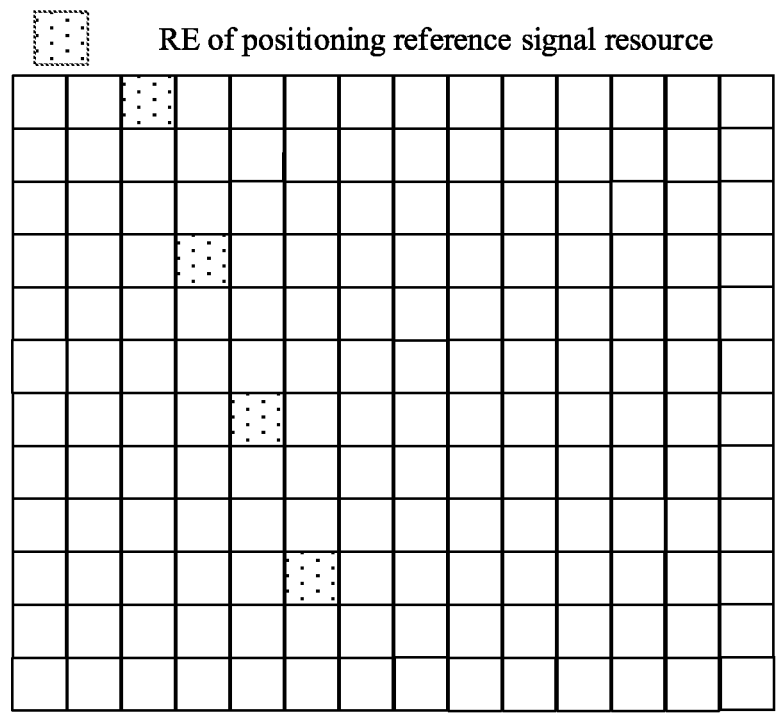
Figure 35:
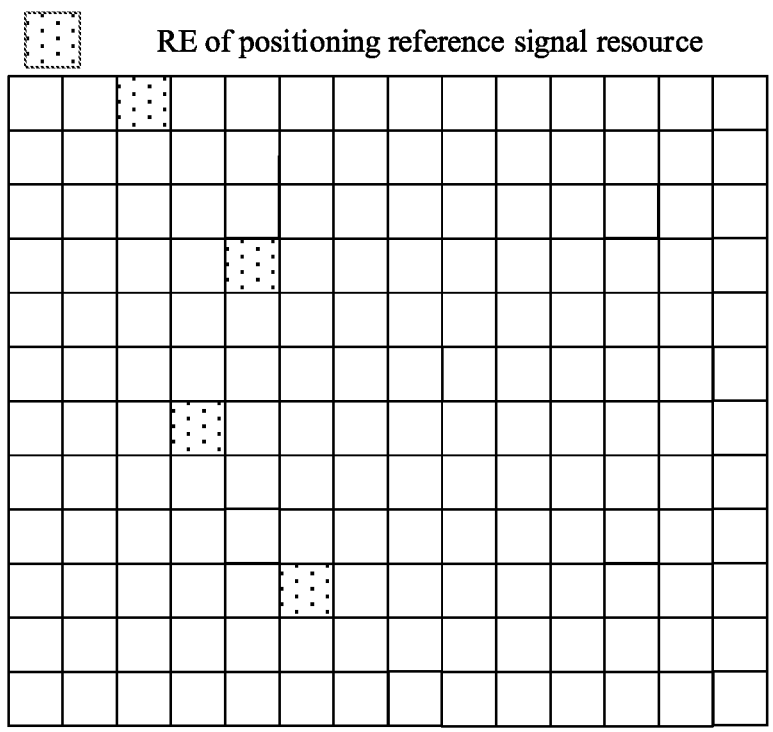
Figure 36:
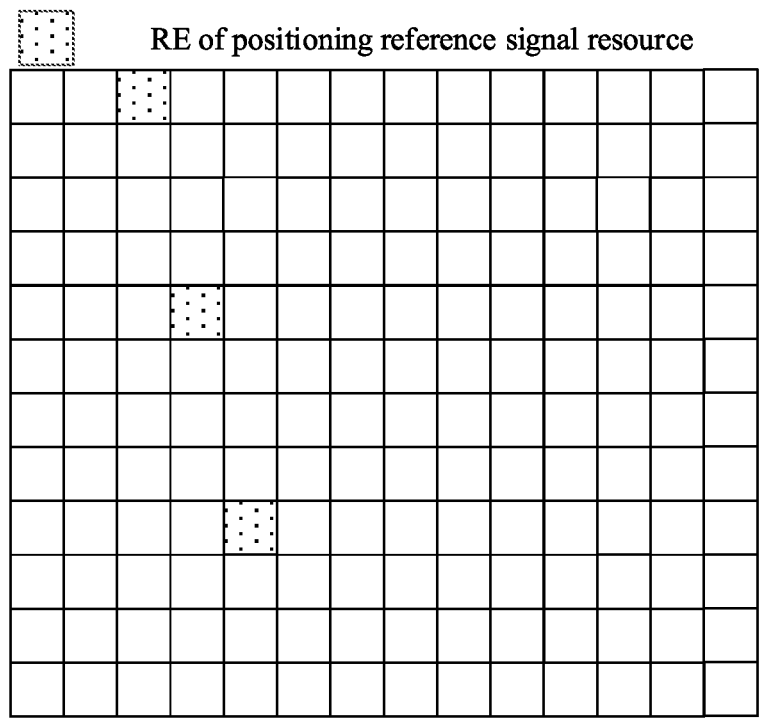
Figure 37:
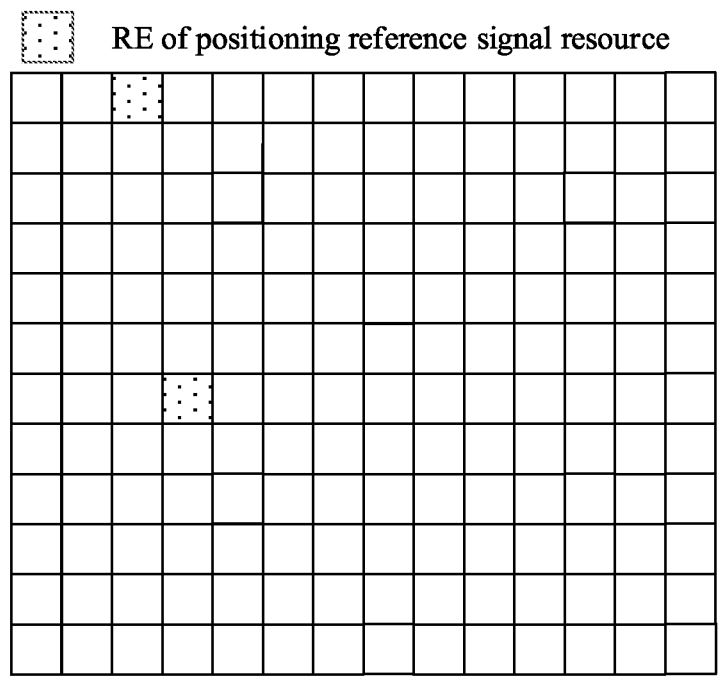
Figure 38:
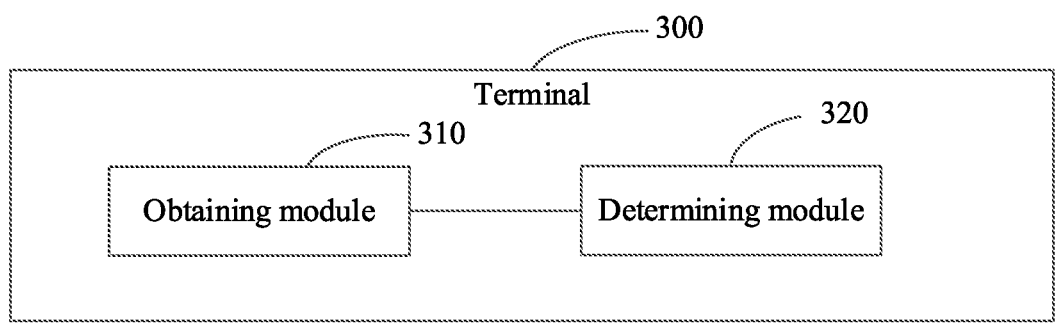
FIG. 38 is a schematic modular structure diagram of a terminal according to an embodiment of this disclosure.

For comb-12, configuration 1 corresponding to a relative RE offset is {0, 6, 1, 7, 2, 8, 3, 9, 4, 10, 5, 11}, and as shown in FIG. 23, parts filled with dots are REs of the positioning reference signal resource; configuration 2 corresponding to a relative RE offset is {0, 4, 8, 1, 5, 9, 2, 6, 10, 3, 7, 11}, and as shown in FIG. 24, parts filled with dots are REs of the positioning reference signal resource; configuration 3 corresponding to a relative RE offset is {0, 6, 3, 9, 1, 7, 4, 10, 2, 8, 5, 11}, and as shown in FIG. 25, parts filled with dots are REs of the positioning reference signal resource; configuration 4 corresponding to a relative RE offset is {0, 3, 6, 9, 1, 4, 7, 10, 2, 5, 8, 11}, and as shown in FIG. 26, parts filled with dots are REs of the positioning reference signal resource; configuration 5 corresponding to a relative RE offset is {0, 2, 4, 6, 8, 10, 1, 3, 5, 7, 9, 11}, and as shown in FIG. 27, parts filled with dots are REs of the positioning reference signal resource; configuration 6 corresponding to a relative RE offset is {0, 6, 2, 8, 4, 10, 1, 7, 3, 9, 5, 11}, and as shown in FIG. 28, parts filled with dots are REs of the positioning reference signal resource; configuration 7 corresponding to a relative RE offset is {0, 4, 8, 2, 6, 10, 1, 5, 9, 3, 7, 11}, and as shown in FIG. 29, parts filled with dots are REs of the positioning reference signal resource; configuration 8 corresponding to a relative RE offset is {0, 1, 2, 3, 4, 5, 6, 7, 8, 9, 10, 11}, and as shown in FIG. 30, parts filled with dots are REs of the positioning reference signal resource; configuration 9 corresponding to a relative RE offset is {0, 2, 4, 6, 8, 10}, and as shown in FIG. 31, parts filled with dots are REs of the positioning reference signal resource; configuration 10 corresponding to a relative RE offset is {0, 4, 8, 2, 6, 10}, and as shown in FIG. 32, parts filled with dots are REs of the positioning reference signal resource; configuration 11 corresponding to a relative RE offset is {0, 6, 2, 8, 4, 10}, and as shown in FIG. 33, parts filled with dots are REs of the positioning reference signal resource; configuration 12 corresponding to a relative RE offset is {0, 3, 6, 9}, and as shown in FIG. 34, parts filled with dots are REs of the positioning reference signal resource; configuration 13 corresponding to a relative RE offset is {0, 6, 3, 9}, and as shown in FIG. 35, parts filled with dots are REs of the positioning reference signal resource; configuration 14 corresponding to a relative RE offset is {0, 4, 8}, and as shown in FIG. 36, parts filled with dots are REs of the positioning reference signal resource; and configuration 15 corresponding to a relative RE offset is {0, 6}, and as shown in FIG. 37, parts filled with dots are REs of the positioning reference signal resource.

As shown in FIG. 8, a terminal 300 in an embodiment of this disclosure includes an apparatus for mapping a positioning reference signal, and can implement method details in the foregoing embodiment of the method for mapping a positioning reference signal, with the same effects achieved. The terminal 300 specifically includes the following functional modules:

an obtaining module 310, configured to obtain mapping information of a positioning reference signal, where the mapping information indicates relative resource element offsets of at least some symbols in a positioning reference signal resource; and a determining module 320, configured to determine, based on the mapping information, a relative resource element offset of each symbol in the positioning reference signal resource.

In this embodiment, the terminal obtains mapping information of a positioning reference signal, where the mapping information indicates relative resource element offsets of at least some symbols in a positioning reference signal resource; and determines, based on the mapping information, a relative resource element offset of each symbol in the positioning reference signal resource. In this way, the terminal can determine, based on the relative resource element offset of each symbol, a resource element location of the positioning reference signal, and transmit the positioning reference signal through the resource element location.

The positioning reference signal may also be referred to as a positioning reference signal resource.

Optionally, the apparatus further includes:

a processing module, configured to: determine, based on the relative resource element offset of each symbol, a resource element location of the positioning reference signal;

and transmit the positioning reference signal through the resource element location.

Optionally, the mapping information is used for indicating configuration information of a set of relative resource element offsets in a table, and the obtaining module 310 is configured to obtain a table corresponding to a comb structure of the positioning reference signal, where the table includes at least one set of configuration information of relative resource element offsets.

Optionally, the obtaining module 310 is further configured to obtain indication information transmitted by a network-side device, where the indication information is used for indicating the terminal to use configuration information of one of sets of relative resource element offsets in the table as the mapping information of the positioning reference signal.

Optionally, one set of the configuration information includes $N_{length}^{Array}$ values indicating relative resource element offsets of the first $N_{length}^{Array}$ symbols in the positioning reference signal resource, respectively, and the relative resource element offset is an offset relative to a resource element offset of the first symbol.

Optionally, a value of $N_{length}^{Array}$ is not greater than the number of symbols $N_{symbol}^{PRS}$ in the positioning reference signal resource.

Optionally, if a value of $N_{length}^{Array}$ is less than the number of symbols $N_{symbol}^{PRS}$ in the positioning reference signal resource, the l'-th symbol in the positioning reference signal resource has the same relative resource element offset as the (l'$-N_{length}^{Array}$)-th symbol, that is, the l'-th symbol in the positioning reference signal resource has the same resource element location as the (l'$-N_{length}^{Array}$)-th symbol, where l' is greater than or equal to $N_{length}^{Array}$, and the 0-th symbol length represents a start symbol of the positioning reference signal resource.

Optionally, a value of $N_{length}^{Array}$ is equal to a comb size of the positioning reference signal resource.

Optionally, obtaining the configuration information includes at least one of the following manners:
receiving the configuration information transmitted by a network-side device;
obtaining the configuration information that is preconfigured; and
obtaining the configuration information defined by a protocol.

Part of the configuration information may be transmitted by the network-side device, part of the configuration information may be preconfigured, or part of the configuration information may be defined by the protocol; or all the configuration information may be transmitted by the network-side device, or all the configuration information may be preconfigured, or all the configuration information may be defined by the protocol.

Optionally, the mapping information is used for indicating a generation formula used by the terminal for calculating a relative resource element offset of each symbol in the positioning reference signal, and the obtaining module 310 is configured to obtain at least one generation formula of a relative resource element offset corresponding to a comb structure of the positioning reference signal, where the generation formula is used for generating a relative resource element offset of each symbol in the positioning reference signal.

Optionally, the obtaining module 310 is further configured to obtain indication information transmitted by a network-side device, where the indication information is used for indicating the terminal to generate a relative resource element offset of each symbol in the positioning reference signal by using one of the at least one generation formula.

Optionally, a calculation parameter of the generation formula includes at least one of the following:
comb structure of the positioning reference signal resource;
symbol index within the positioning reference signal resource; and
number of symbols in the positioning reference signal resource.

Optionally, the generation formula includes:

$$RE_{relative\_offset} = floor\left(\frac{l' \mod(K_{TC})}{4 + K_{TC}\mod(4)}\right) +$$
$$floor\left(\frac{K_{TC}}{4}\right) * floor\left(\frac{l'\mod(4 + K_{TC}\mod(4))}{2}\right) + K_{TC}/2 * l'\mod(2)$$

where l' represents the symbol index within the resource, l'=0, 1 ... $N_{symbol}^{PRS}$−1, $K_{TC}$ represents a comb size of the resource, and $RE_{relative\_offset}$ represents a relative resource element offset of each symbol in the positioning reference signal.

Optionally, the generation formula includes:

$$RE_{relative\_offset} =$$
$$floor\left(\frac{l'\mod(K_{TC})}{4}\right) + floor\left(\frac{K_{TC}}{4}\right) * floor\left(\frac{l'\mod(4)}{2}\right) + K_{TC}/2 * l'\mod(2)$$

where l' represents the symbol index within the resource, l'=0, 1 ... $N_{symbol}^{PRS}$−1, $K_{TC}$ represents a comb size of the resource, and $RE_{relative\_offset}$ represents a relative resource element offset of each symbol in the positioning reference signal.

Optionally, the number of symbols $N_{symbol}^{PRS}$ in the positioning reference signal resource is not less than X, X is a periodicity of the generation formula or a periodicity of a sequence generated by the generation formula, X is equal to $K_{TC}$ or is one of factors of $K_{TC}$, and $K_{TC}$ represents a comb size of the positioning reference signal resource.

Optionally, the obtaining the generation formula includes at least one of the following manners:
receiving the generation formula transmitted by a network-side device;
obtaining the generation formula that is preconfigured; and
obtaining the generation formula defined by a protocol.

Part of the generation formula may be transmitted by the network-side device, part of the generation formula may be preconfigured, or part of the generation formula may be defined by the protocol; or all the generation formula may be transmitted by the network-side device, or all the generation formula may be preconfigured, or all the generation formula may be defined by the protocol.

Optionally, a relative resource element offset of the first symbol in the positioning reference signal resource is 0.

Optionally, the positioning reference signal is a downlink positioning reference signal, and the indication information is carried in long term evolution positioning protocol LPP signaling transmitted by the network-side device.

Optionally, a comb size supported by the downlink positioning reference signal includes at least one of 2, 4, 6, 8, and 12.

Optionally, the positioning reference signal is an uplink positioning reference signal, and the indication information is carried in radio resource control RRC signaling or LPP signaling transmitted by the network-side device.

Optionally, a comb size supported by the uplink positioning reference signal includes at least one of 2, 4, and 8.

Figure 39:
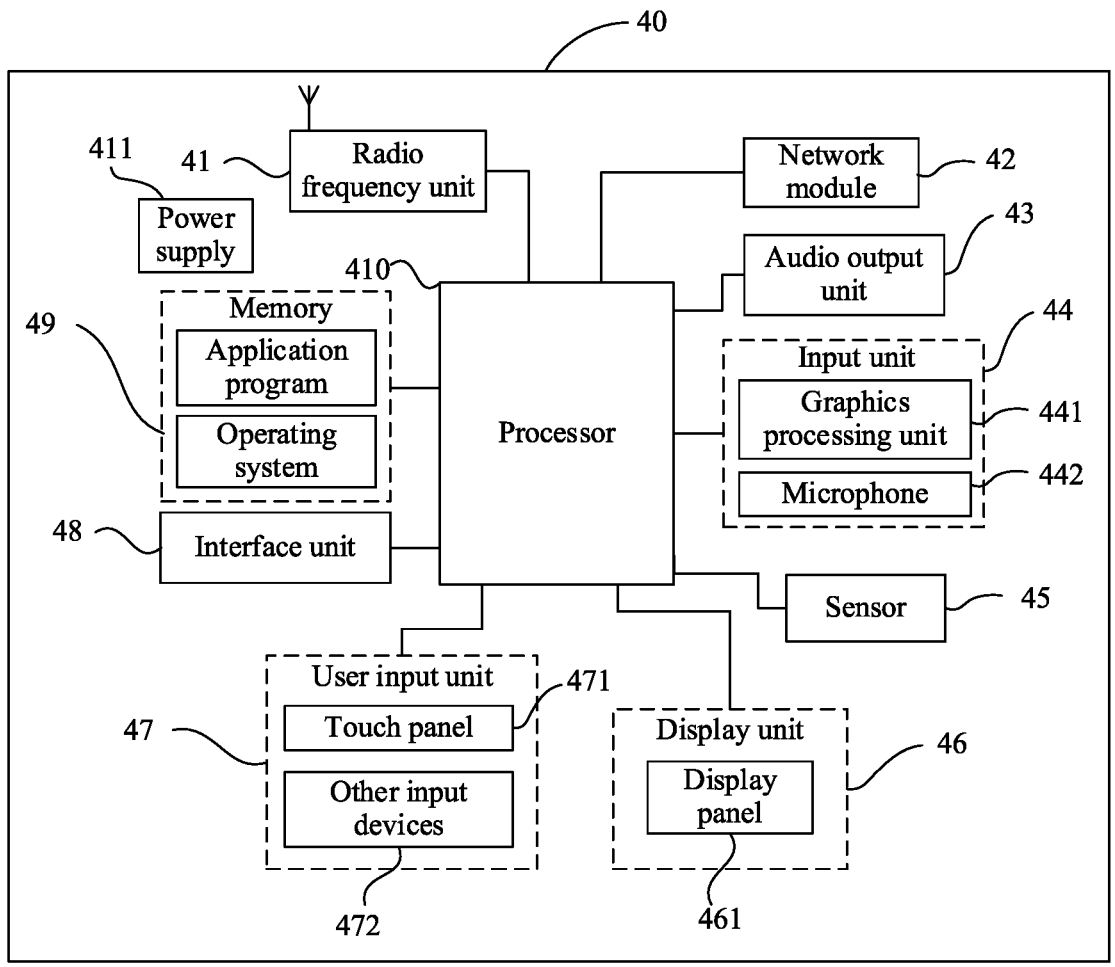
FIG. 39 is a block diagram of a terminal according to an embodiment of this disclosure.

To better achieve the foregoing objective, further, FIG. 39 is a schematic diagram of a hardware structure of a terminal for implementing each embodiment of this disclosure. The terminal 40 includes but is not limited to components such as a radio frequency unit 41, a network module 42, an audio output unit 43, an input unit 44, a sensor 45, a display unit 46, a user input unit 47, an interface unit 48, a memory 49, a processor 410, and a power supply 411. A person skilled in the art can understand that the structure of the terminal shown in FIG. 39 does not constitute any limitation on the terminal, and the terminal may include more or fewer components than shown in the diagram, or some components may be combined, or the components may be arranged in different manners. In this embodiment of this disclosure, the terminal includes but is not limited to a mobile phone, a tablet computer, a notebook computer, a palmtop computer, an in-vehicle terminal, a wearable device, a pedometer, and the like.

The processor 410 is configured to obtain mapping information of a positioning reference signal, where the mapping information indicates relative resource element offsets of at least some symbols in a positioning reference signal resource; and determine, based on the mapping information, a relative resource element offset of each symbol in the positioning reference signal resource.

It should be understood that, in this embodiment of this disclosure, the radio frequency unit 41 may be configured to transmit or receive a signal in an information transmitting/receiving or call process. Specifically, the radio frequency unit 41 receives downlink data from a base station and transmits the downlink data to the processor 410 for processing; and transmits uplink data to the base station. Generally, the radio frequency unit 41 includes but is not limited to an antenna, at least one amplifier, a transceiver, a coupler, a low noise amplifier, a duplexer, and the like. In addition, the radio frequency unit 41 may also communicate with a network and other devices via a wireless communications system.

The terminal provides a user with wireless broadband Internet access by using the network module 42, for example, helping the user to transmit and receive e-mails, browse web pages, and access streaming media.

The audio output unit 43 may convert audio data into an audio signal, and output the audio signal as sound, where the audio data is received by the radio frequency unit 41 or the network module 42, or stored in the memory 49. In addition, the audio output unit 43 may further provide audio output (for example, a call signal received tone or a message received tone) that is related to a specific function performed by the terminal 40. The audio output unit 43 includes a speaker, a buzzer, a receiver, and the like.

The input unit 44 is configured to receive an audio or video signal. The input unit 44 may include a graphics processing unit (GPU) 441 and a microphone 442, and the graphics processing unit 441 processes image data of a static picture or a video obtained by an image capture apparatus (for example, a camera) in an image capture mode or a video capture mode. A processed image frame may be displayed on the display unit 46. The image frame processed by the graphics processing unit 441 may be stored in the memory 49 (or another storage medium) or transmitted by using the radio frequency unit 41 or the network module 42. The microphone 442 can receive sounds and process such sounds into audio data. The processed audio data can be converted in a telephone call mode into a format that can be transmitted by the radio frequency unit 41 to a mobile communication base station, for outputting.

The terminal 40 may further include at least one sensor 45, for example, an optical sensor, a motion sensor, and other sensors. Specifically, the optical sensor may include an ambient light sensor and a proximity sensor. The ambient light sensor may adjust luminance of the display panel 461 based on brightness of ambient light, and the proximity sensor may turn off the display panel 461 and/or backlight when the terminal 40 moves close to an ear. As a motion sensor, an accelerometer sensor may detect magnitudes of accelerations in various directions (typically three axes), and in a stationary state, may detect the magnitude and direction of gravity, and may be applied for terminal posture recognition (for example, switching between a landscape orientation and a portrait orientation, related gaming, and magnetometer posture calibration), vibration recognition related functions (for example, pedometer and tapping), and the like. The sensor 45 may further include a fingerprint sensor, a pressure sensor, an iris sensor, a molecular sensor, a gyroscope, a barometer, a hygrometer, a thermometer, an infrared sensor, and the like. Details are not described herein.

The display unit 46 is configured to display information input by the user or information provided to the user. The display unit 46 may include the display panel 461. The display panel 461 may be configured in a form of a liquid crystal display (LCD), an organic light-emitting diode (OLED), or the like.

The user input unit 47 may be configured to receive input digit or character information, and generate a key signal input related to a user setting and function control of the terminal. Specifically, the user input unit 47 includes a touch panel 471 and other input devices 472. The touch panel 471, or referred to as a touchscreen, may capture a touch operation performed by a user on or near the touch panel 471 (for example, an operation performed by the user on the touch panel 471 or near the touch panel 471 by using any appropriate object or accessory such as a finger or a stylus). The touch panel 471 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touchpoint coordinates, transmits the touchpoint coordinates to the processor 410, and receives and executes a command transmitted by the processor 410. In addition, the touch panel 471 may be implemented in a plurality of forms, for example, as a resistive, capacitive, infrared, or surface acoustic wave touch panel. In addition to the touch panel 471, the user input unit 47 may further include other input devices 472. Specifically, the other input devices 472 may include but are not limited to a physical keyboard, a function key (for example, a volume control key or a switch key), a trackball, a mouse, and a joystick. Details are not described herein.

Further, the touch panel 471 may cover the display panel 461. After detecting a touch operation on or near the touch panel 471, the touch panel 471 transmits the touch operation to the processor 410 to determine a type of a touch event. Then the processor 410 provides corresponding visual output on the display panel 461 based on the type of the touch event. In FIG. 4, the touch panel 471 and the display panel 461 serve as two separate components to implement input and output functions of the terminal. However, in some embodiments, the touch panel 471 and the display panel 461 may be integrated to implement the input and output functions of the terminal. This is not specifically limited herein.

The interface unit 48 is an interface between an external apparatus and the terminal 40. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 48 may be configured to receive an input (for example, data information or power) from an external apparatus, and transmit the received input to one or more components in the terminal 40, or may be configured to transmit data between the terminal 40 and an external apparatus.

The memory 49 may be configured to store software programs and various data. The memory 49 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 49 may include a high-speed random access memory, or may further include a non-volatile memory, for example, at least one magnetic disk storage device, a flash memory, or another volatile solid-state storage device.

The processor 410 is a control center of the terminal, and is connected to all components of the terminal by using various interfaces and lines. By running or executing a software program and/or a module stored in the memory 49 and invoking data stored in the memory 49, the processor 410 executes various functions of the terminal and processes data, so as to perform overall monitoring on the terminal. The processor 410 may include one or more processing units. Preferably, the processor 410 may integrate an application processor and a modem processor. The application processor mainly processes the operating system, a user interface, an application program, and the like. The modem processor mainly processes wireless communication. It can be understood that the modem processor may alternatively be not integrated in the processor 410.

The terminal 40 may further include the power supply 411 (such as a battery) supplying power to each component. Preferably, the power supply 411 may be logically connected to the processor 410 by using a power management system, so that functions such as charge and discharge management and power consumption management are implemented by using the power management system.

In addition, the terminal 40 includes some functional modules that are not shown. Details are not described herein.

Preferably, an embodiment of this disclosure further provides a terminal, including a processor 410, a memory 49, and a computer program stored in the memory 49 and capable of running on the processor 410. When the computer program is executed by the processor 410, the processes of the foregoing embodiments of the method for mapping a positioning reference signal are implemented, with the same technical effects achieved. To avoid repetition, details are not described herein again. The terminal may be a wireless terminal or a wired terminal. The wireless terminal may be a device providing a user with voice and/or other service data connectivity, a handheld device having a wireless connection function, or another processing device connected to a wireless modem. The wireless terminal may communicate with one or more core networks through a radio access network (RAN). The wireless terminal may be a mobile terminal such as a mobile phone (also referred to as a "cellular" phone) or a computer having a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, a remote terminal, an access terminal, a user terminal, a user agent, or a user device. This is not limited herein.

An embodiment of this disclosure further provides a computer-readable storage medium, where a computer program is stored in the computer-readable storage medium. When the computer program is executed by a processor, the processes of the foregoing embodiments of the method for mapping a positioning reference signal are implemented, with the same technical effects achieved. To avoid repetition, details are not described herein again. For example, the computer-readable storage medium is a read-only memory (ROM), a random access memory (RAM), a magnetic disk, or an optical disc.

Figure 40:
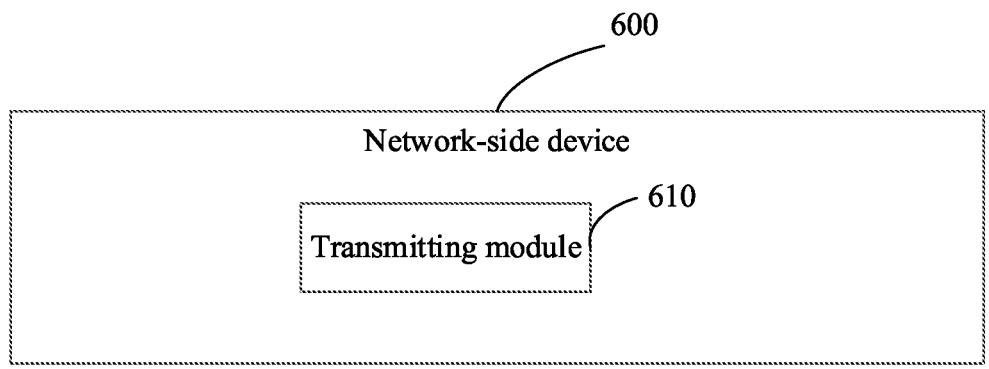
FIG. 40 is a schematic modular structure diagram of a network-side device according to an embodiment of this disclosure.

As shown in FIG. 40, a network-side device 600 in an embodiment of this disclosure includes an apparatus for mapping a positioning reference signal, and can implement method details in the foregoing embodiment of the method for mapping a positioning reference signal, with the same effects achieved. The network-side device 600 specifically includes the following functional modules:

a transmitting module 610, configured to transmit mapping information of a positioning reference signal to a terminal, where the mapping information indicates relative resource element offsets of at least some symbols in a positioning reference signal resource.

In this embodiment, the network-side device transmits mapping information of a positioning reference signal to a terminal, where the mapping information indicates relative resource element offsets of at least some symbols in a positioning reference signal resource; and the terminal determines, based on the mapping information, a relative resource element offset of each symbol in the positioning reference signal resource. In this way, the terminal can determine, based on the relative resource element offset of each symbol, a resource element location of the positioning reference signal, and transmit the positioning reference signal through the resource element location.

Optionally, the transmitting module 610 is configured to transmit a table corresponding to a comb structure of the positioning reference signal, where the table includes at least one set of configuration information of relative resource element offsets.

Optionally, the transmitting module 610 is further configured to transmit indication information to the terminal, where the indication information is used for indicating the terminal to use configuration information of one of sets of relative resource element offsets in the table as the mapping information of the positioning reference signal.

Optionally, one set of the configuration information includes $N_{length}^{Array}$ values indicating relative resource element offsets of the first $N_{length}^{Array}$ symbols in the positioning reference signal resource, respectively, and the relative resource element offset is an offset relative to a resource element offset of the first symbol.

Optionally, a value of $N_{length}^{Array}$ is not greater than the number of symbols $N_{symbol}^{PRS}$ in the positioning reference signal resource.

Optionally, if a value of $N_{length}^{Array}$ is less than the number of symbols $N_{symbol}^{PRS}$ in the positioning reference signal resource, the l'-th symbol in the positioning reference signal resource has a same relative resource element offset as the (l'−$N_{length}^{Array}$)-th symbol, where l' is greater than or equal to $N_{length}^{Array}$, and 0-th symbol represents a start symbol of the positioning reference signal resource.

Optionally, a value of $N_{length}^{Array}$ is equal to a comb size of the positioning reference length signal resource.

Optionally, the transmitting module 610 is configured to transmit at least one generation formula of a relative resource element offset corresponding to a comb structure of the positioning reference signal to the terminal, where the generation formula is used for generating a relative resource element offset of each symbol in the positioning reference signal.

Optionally, the transmitting module 610 is further configured to transmit indication information to the terminal, where the indication information is used for indicating the terminal to generate a relative resource element offset of each symbol in the positioning reference signal by using one of the at least one generation formula.

Optionally, a calculation parameter of the generation formula includes at least one of the following:
comb structure of the positioning reference signal resource;
symbol index within the positioning reference signal resource; and
number of symbols in the positioning reference signal resource.

Optionally, the generation formula includes:

$$RE_{relative\_offset} = \text{floor}\left(\frac{l'\text{mod}(K_{TC})}{4+K_{TC}\text{mod}(4)}\right) +$$
$$\text{floor}\left(\frac{K_{TC}}{4}\right) * \text{floor}\left(\frac{l'\text{mod}(4+K_{TC}\text{mod}(4))}{2}\right) + K_{TC}/2 * l'\text{mod}(2)$$

where l' represents the symbol index within the resource, l'=0, 1 ... $N_{symbol}^{PRS}$−1, $K_{TC}$ represents a comb size of the resource, and $RE_{relative\_offset}$ represents a relative resource element offset of each symbol in the positioning reference signal.

Optionally, the generation formula includes:

$$RE_{relative\_offset} =$$
$$\text{floor}\left(\frac{l'\text{mod}(K_{TC})}{4}\right) + \text{floor}\left(\frac{K_{TC}}{4}\right) * \text{floor}\left(\frac{l'\text{mod}(4)}{2}\right) + K_{TC}/2 * l'\text{mod}(2)$$

where l' represents the symbol index within the resource, l'=0, 1 ... $N_{symbol}^{PRS}$−1, $K_{TC}$ represents a comb size of the resource, and $RE_{relative\_offset}$ represents a relative resource element offset of each symbol in the positioning reference signal.

Optionally, the number of symbols $N_{symbol}^{PRS}$ in the positioning reference signal resource is not less than X, X is a periodicity of the generation formula or a periodicity of a sequence generated by the generation formula, X is equal to $K_{TC}$ or is one of factors of $K_{TC}$, and $K_{TC}$ represents a comb size of the positioning reference signal resource.

Optionally, a relative resource element offset of the first symbol in the positioning reference signal resource is 0.

Optionally, the positioning reference signal is a downlink positioning reference signal, and the indication information is carried in long term evolution positioning protocol LPP signaling transmitted by the network-side device.

Optionally, a comb size supported by the downlink positioning reference signal includes at least one of 2, 4, 6, 8, and 12.

Optionally, the positioning reference signal is an uplink positioning reference signal, and the indication information is carried in radio resource control RRC signaling or LPP signaling transmitted by the network-side device.

Optionally, a comb size supported by the uplink positioning reference signal includes at least one of 2, 4, and 8.

It should be noted that, it should be understood that division of modules of the network-side device and the terminal is merely logical function division. The modules may be all or partially integrated in a physical entity or may be separated physically in an actual implementation. In addition, the modules may be all implemented in a form of software invoked by a processing component, or may be all implemented in a form of hardware; or a part of modules may be implemented in a form of software invoked by a processing component, and another part of modules may be implemented in a form of hardware. For example, a determining module may be a processing component that is separately disposed, or may be integrated in a chip of the apparatus for implementation. In addition, the determining module may be stored in the memory of the apparatus in a form of program code, and is invoked by a processing component of the apparatus to perform a function of the determining module. Implementation of other modules is similar to this. In addition, all or some of the modules may be integrated, or may be implemented independently. Herein, the processing component may be an integrated circuit, and has a signal processing capability. In an implementation process, the steps in the foregoing method or the foregoing modules may be implemented by using an integrated logic circuit of hardware of the processor component or by using instructions in a form of software.

For example, the modules above may be one or more integrated circuits configured to implement the foregoing method, for example, one or more application-specific integrated circuits (ASIC), or one or more microprocessors (DSP), or one or more field programmable gate arrays (FPGA). For another example, when one of the foregoing modules is implemented in a form of program code invoked by a processing component, the processing component may be a general-purpose processor, for example, a central processing unit (CPU) or another processor that may invoke program code. For another example, the modules may be integrated in a form of a system-on-a-chip (SOC) for implementation.

To better achieve the foregoing objective, an embodiment of this disclosure further provides a network-side device. The network-side device includes a processor, a memory, and a computer program stored in the memory and capable of running on the processor, where when the processor executes the computer program, the steps of the foregoing method for mapping a positioning reference signal are implemented, with the same technical effects achieved. To avoid repetition, details are not described herein again.

An embodiment of this disclosure further provides a computer-readable storage medium, where a computer program is stored in the computer readable storage medium, and when the computer program is executed by a processor, the steps of the foregoing method for mapping a positioning reference signal applied in the network-side device are implemented, with the same technical effects achieved. To avoid repetition, details are not described herein again.

Figure 41:
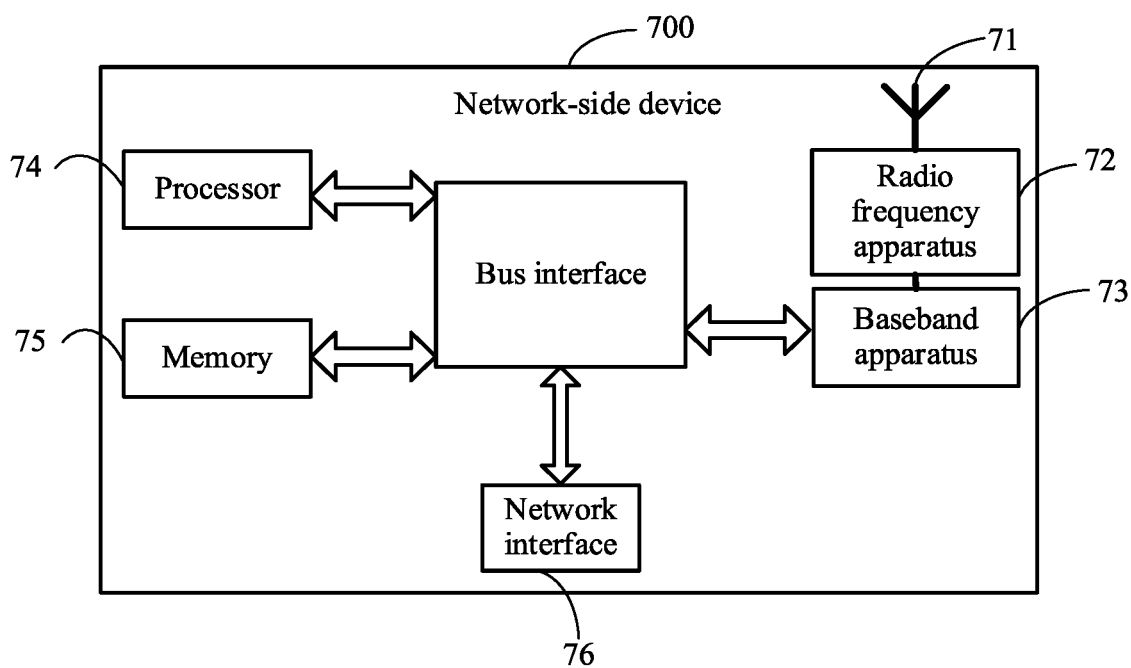
FIG. 41 is a block diagram of a network-side device according to an embodiment of this disclosure.

Specifically, an embodiment of this disclosure further provides a network-side device. As shown in FIG. 41, the network-side device 700 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and transmits the received information to the baseband apparatus 73 for processing. In a downlink direction, the baseband apparatus 73 processes to-be-transmitted information, and transmits the information to the radio frequency apparatus 72; and the radio frequency apparatus 72 processes the received information and then transmits the information by using the antenna 71.

A band processing apparatus may be located in the baseband apparatus 73. The method performed by the network-side device in the foregoing embodiment may be implemented by the baseband apparatus 73, and the baseband apparatus 73 includes a processor 74 and a memory 75.

The baseband apparatus 73 may include, for example, at least one baseband processing unit, where a plurality of chips are disposed on the baseband processing unit. As shown in FIG. 41, one of the chips is, for example, the processor 74, and connected to the memory 75, to invoke the program in the memory 75 to perform the operations of the network-side device shown in the foregoing method embodiment.

The baseband apparatus 73 may further include a network interface 76, configured to exchange information with the radio frequency apparatus 72, where the interface is, for example, a common public radio interface (CPRI).

The processor herein may be one processor, or may be a collective term for a plurality of processing components. For example, the processor may be a CPU, or may be an ASIC, or may be one or more integrated circuits configured to implement the method performed by the network-side device, for example, one or more microprocessors DSPs, or one or more field programmable gate arrays FPGAs. A storage component may be a memory, or may be a collective term for a plurality of storage components.

The memory 75 may be a volatile memory or a non-volatile memory, or may include a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), which is used as an external cache. By way of example but not restrictive description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct rambus random access memory (Direct Rambus RAM, DRRAM). The memory 75 described in this application is intended to include but is not limited to these and any other suitable types of memories.

Specifically, the network-side device in this embodiment of this disclosure further includes a computer program stored in the memory 75 and capable of running on the processor 74. The processor 74 invokes the computer program in the memory 75 to perform the method performed by the modules shown in FIG. 40.

Specifically, the computer program, when invoked by the processor 74, may be used to obtain mapping information of a positioning reference signal, where the mapping information indicates relative resource element offsets of at least some symbols in a positioning reference signal resource.

Persons of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the related art, or some of the technical solutions may be implemented in a form of a software product. The software product is stored in a storage medium, and includes several instructions for instructing a computer device (which may be a personal computer, a server, or a network-side device) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. Persons of ordinary skill in the art can understand that all or any steps or components of the method and apparatus in this disclosure may be implemented by hardware, firmware, software, or a combination thereof in any computing apparatus (including a processor, a storage medium, and the like) or a network of computing apparatuses. This can be implemented as long as persons of ordinary skill in the art apply basic programming skill after reading the specification of this disclosure.

Therefore, the objective of this disclosure may also be achieved by running a program or a group of programs on any computing apparatus. The computing apparatus may be a well-known general apparatus. Therefore, the objective of this disclosure may also be achieved by merely providing a program product including program code for implementing the method or apparatus. Therefore, such program product also constitutes this disclosure, and a storage medium storing such program product also constitutes this disclosure. Apparently, the storage medium may be any storage medium of common sense or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in time sequence following the order of description, but are not necessarily performed in time sequence. Some steps may be performed in parallel or separate from each other.

The foregoing descriptions are preferred implementations of this disclosure. It should be noted that persons of ordinary skill in the art may make several improvements or refinements without departing from the principle of this disclosure and the improvements or refinements shall fall within the protection scope of this disclosure.

What is claimed is:

1. A method for mapping a positioning reference signal, applied to a terminal and comprising:
    obtaining mapping information of a positioning reference signal, wherein the mapping information indicates relative resource element offsets of at least some symbols in a positioning reference signal resource, the relative resource element offset is an offset relative to a resource element offset of a first symbol of the positioning reference signal resource; and
    determining, based on the mapping information, a relative resource element offset of each symbol in the positioning reference signal resource;
    wherein the obtaining mapping information of a positioning reference signal comprises:
    obtaining a table corresponding to a comb structure of the positioning reference signal, wherein the table comprises at least one set of configuration information of relative resource element offsets.

2. The method for mapping a positioning reference signal according to claim 1, wherein the obtaining mapping information of a positioning reference signal further comprises:
    obtaining indication information transmitted by a network-side device, wherein the indication information is used for indicating the terminal to use configuration information of one of sets of relative resource element offsets in the table as the mapping information of the positioning reference signal.

3. The method for mapping a positioning reference signal according to claim 1, wherein one set of the configuration information comprises $N_{length}^{Array}$ values indicating relative resource element offsets of the first $N_{length}^{Array}$ symbols in the positioning reference signal resource, respectively.

4. The method for mapping a positioning reference signal according to claim 3, wherein if a value of $N_{length}^{Array}$ is less than the number of symbols $N_{symbol}^{PRS}$ in the positioning reference signal resource, the l'-th symbol in the positioning reference signal resource has a same relative resource element offset as the (l'-$N_{length}^{Array}$)-th symbol, wherein l' is greater than or equal to $N_{length}^{Array}$, and the 0-th symbol represents a start symbol of the positioning reference signal resource.

5. The method for mapping a positioning reference signal according to claim 3, wherein a value of $N_{length}^{Array}$ length is equal to a comb size of the positioning reference signal resource.

6. The method for mapping a positioning reference signal according to claim 1, wherein the obtaining mapping information of a positioning reference signal comprises:
    obtaining at least one generation formula of a relative resource element offset corresponding to a comb structure of the positioning reference signal, wherein the generation formula is used for generating a relative resource element offset of each symbol in the positioning reference signal.

7. The method for mapping a positioning reference signal according to claim 6, wherein a calculation parameter of the generation formula comprises at least one of the following:
    comb structure of the positioning reference signal resource;
    symbol index within the positioning reference signal resource; and
    number of symbols in the positioning reference signal resource.

8. The method for mapping a positioning reference signal according to claim 6, wherein the generation formula comprises:

$$RE_{relative\_offset} = floor\left(\frac{l' \bmod(K_{TC})}{4}\right) + floor\left(\frac{K_{TC}}{4}\right) * floor\left(\frac{l' \bmod(4)}{2}\right) + K_{TC}/2 * l' \bmod(2)$$

wherein l' represents the symbol index within the resource, l'=0,1...$N_{symbol}^{PRS}$-1, $K_{TC}$ represents a comb size of the resource, and $RE_{relative\_offset}$ represents a relative resource element offset of each symbol in the positioning reference signal.

9. A method for mapping a positioning reference signal, applied to a network-side device and comprising:
    transmitting mapping information of a positioning reference signal to a terminal, wherein the mapping information indicates relative resource element offsets of at least some symbols in a positioning reference signal resource, the relative resource element offset is an offset relative to a resource element offset of a first symbol of the positioning reference signal resource;

wherein the transmitting mapping information of a positioning reference signal to a terminal comprises:
transmitting a table corresponding to a comb structure of the positioning reference signal, wherein the table comprises at least one set of configuration information of relative resource element offsets.

10. The method for mapping a positioning reference signal according to claim 9, wherein the transmitting mapping information of a positioning reference signal to a terminal further comprises:
transmitting indication information to the terminal, wherein the indication information is used for indicating the terminal to use configuration information of one of sets of relative resource element offsets in the table as the mapping information of the positioning reference signal.

11. The method for mapping a positioning reference signal according to claim 9, wherein one set of the configuration information comprises $N_{length}^{Array}$ values indicating relative resource element offsets of the first $N_{length}^{Array}$ symbols in the positioning reference signal resource, respectively.

12. A communications device, comprising a processor, a memory, and a computer program stored in the memory and running on the processor, wherein when the processor executes the computer program, following steps are implemented:
obtaining mapping information of a positioning reference signal, wherein the mapping information indicates relative resource element offsets of at least some symbols in a positioning reference signal resource, the relative resource element offset is an offset relative to a resource element offset of a first symbol of the positioning reference signal resource; and
determining, based on the mapping information, a relative resource element offset of each symbol in the positioning reference signal resource;
wherein when the processor executes the computer program, following steps are further implemented:
obtaining a table corresponding to a comb structure of the positioning reference signal, wherein the table comprises at least one set of configuration information of relative resource element offsets.

13. The communication device according to claim 12, wherein when the processor executes the computer program, following steps are further implemented:
obtaining indication information transmitted by a network-side device, wherein the indication information is used for indicating the terminal to use configuration information of one of sets of relative resource element offsets in the table as the mapping information of the positioning reference signal.

14. The communication device according to claim 12, wherein one set of the configuration information comprises $N_{length}^{Array}$ values indicating relative resource element offsets of the first $N_{length}^{Array}$ symbols in the positioning reference signal resource, respectively.

15. The communication device according to claim 14, wherein if a value of $N_{length}^{Array}$ is less than the number of symbols $N_{symbol}^{PRS}$ in the positioning reference signal resource, the l'-th symbol in the positioning reference signal resource has a same relative resource element offset as the (l'-$N_{length}^{Array}$)-th symbol, wherein l' is greater than or equal to $N_{length}^{Array}$, and the 0-th symbol represents a start symbol of the positioning reference signal resource.

16. The communication device according to claim 14, wherein a value of $N_{length}^{Array}$ is equal to a comb size of the positioning reference signal resource.

17. The communication device according to claim 12, wherein when the processor executes the computer program, following steps are further implemented:
obtaining at least one generation formula of a relative resource element offset corresponding to a comb structure of the positioning reference signal, wherein the generation formula is used for generating a relative resource element offset of each symbol in the positioning reference signal.

* * * * *